(12) United States Patent
Harada et al.

(10) Patent No.: US 12,522,579 B2
(45) Date of Patent: Jan. 13, 2026

(54) MONOAMINE OXIDASE B IMAGING PROBE

(71) Applicant: TOHOKU UNIVERSITY, Miyagi (JP)

(72) Inventors: Ryuichi Harada, Sendai (JP); Shozo Furumoto, Sendai (JP); Yukitsuka Kudo, Sendai (JP); Nobuyuki Okamura, Sendai (JP)

(73) Assignee: TOHOKU UNIVERSITY, Miyagi (JP)

( * ) Notice: Subject to any disclaimer, the term of this patent is extended or adjusted under 35 U.S.C. 154(b) by 988 days.

(21) Appl. No.: 17/265,988

(22) PCT Filed: Aug. 6, 2019

(86) PCT No.: PCT/JP2019/030936
§ 371 (c)(1),
(2) Date: Apr. 14, 2021

(87) PCT Pub. No.: WO2020/032038
PCT Pub. Date: Feb. 13, 2020

(65) Prior Publication Data
US 2021/0230139 A1    Jul. 29, 2021

(30) Foreign Application Priority Data
Aug. 7, 2018   (JP) .................. 2018-148863

(51) Int. Cl.
C07D 401/04      (2006.01)
A61K 51/04       (2006.01)
C07B 59/00       (2006.01)

(52) U.S. Cl.
CPC ........ C07D 401/04 (2013.01); A61K 51/0455 (2013.01); C07B 59/00 (2013.01); *C07B 2200/05* (2013.01)

(58) Field of Classification Search
None
See application file for complete search history.

(56) References Cited

U.S. PATENT DOCUMENTS

| | | | |
|---|---|---|---|
| 9,701,637 B2* | 7/2017 | Kudo | .............. A61P 25/28 |
| 2010/0239496 A1 | 9/2010 | Gangadharmath et al. | |
| 2013/0324523 A1 | 12/2013 | Kudo et al. | |
| 2016/0244411 A1 | 8/2016 | Kudo et al. | |

FOREIGN PATENT DOCUMENTS

| | | |
|---|---|---|
| JP | 2012-521988 | 9/2012 |
| WO | 2012/057312 | 5/2012 |
| WO | 2015/060365 | 4/2015 |
| WO | 2017/103257 | 6/2017 |

OTHER PUBLICATIONS

Ramsay RR. Molecular aspects of monoamine oxidase B. Progress in neuro-psychopharmacology and biological Psychiatry. Aug. 1, 2016;69:81-9. (Year: 2016).*
Jones TZ, Balsa D, Unzeta M, Ramsay RR. Variations in activity and inhibition with pH: the protonated amine is the substrate for monoamine oxidase, but uncharged inhibitors bind better. Journal of neural transmission. Jun. 2007;114:707-12. (Year: 2007).*
"What is the difference between Ki and IC50 in enzyme inhibition?" from https://www.aatbio.com/resources/faq-frequently-asked-questions/What-is-the-difference-between-Ki-and-IC50-in-enzyme-inhibition, posted Jul. 22, 202, accessed Nov. 4, 2024 (Year: 2020).*
International Search Report (ISR) issued Oct. 21, 2019 in International (PCT) Application No. PCT/JP2019/030936.
International Preliminary Report on Patentability issued Feb. 9, 2021 together with English translation thereof and Written Opinion of the International Searching Authority in International (PCT) Application No. PCT/JP2019/030936.
Chester A. Mathis et al., "Small-molecule PET Tracers for Imaging Proteinopathies", Seminars in Nuclear Medicine, 47(5), pp. 553-575, 2017, cited in the specification.
Junchao Tong et al., "Distribution of monoamine oxidase proteins in human brain: implications for brain imaging studies", Journal of Cerebral Blood Flow & Metabolism, 33(6), pp. 863-871, 2013, cited in the specification.
Junchao Tong et al., "Brain monoamine oxidase B and A in human parkinsonian dopamine deficiency disorders", Brain A Journal of Neurology, 140(9), pp. 2460-2474, 2017, cited in the specification.
Milos Pekny et al., "Astrocytes: a central element in neurological diseases", Acta Neuropathol, 131, pp. 323-345, 2016, cited in the specification.
Jonas Ekblom et al., "Monoamine Oxidase-B in Astrocytes", GLIA, 8, pp. 122-132, 1993, cited in the specification.
Nobuyuki Okamura et al., "The development and validation of tau PET tracers: current status and future directions", Clinical and Translational Imaging, 6, pp. 305-316, 2018, cited in the specification.
Ryuichi Harada et al., "[18]F-THK5351: A Novel PET Radiotracer for Imaging Neurofibrillary Pathology in Alzheimer Disease", The Journal of Nuclear Medicine, vol. 57, No. 2, pp. 208-214, Feb. 2016, cited in the specification.
Office Action issued Mar. 8, 2022 in corresponding Japanese Patent Application No. 2018-148863, with English-language translation.
Wermuth, Camille G., "Conversion of Molecule based on Isosteric Substitution", The Practice of Medicinal Chemistry, pp. 235-271, with partial English-language translation.
Okamura, Nobuyuki et al., "Development of Molecular Imaging Probe targeting to Alzheimer's pathology", Folia Pharamacol, Jpn., Sep. 30, 2017, vol. 150, No. 4, pp. 172-176, with partial English-language translation.
Extended European Search Report issued Mar. 21, 2022 in corresponding European Patent Application No. 19846498.4.

* cited by examiner

*Primary Examiner* — Nissa M Westerberg
(74) *Attorney, Agent, or Firm* — Wenderoth, Lind & Ponack, L.L.P.

(57) ABSTRACT

The present invention provides a compound represented by formula (I) that can image monoamine oxidase-B with high specificity and selectivity for monoamine oxidase-B and with good sensitivity, or a pharmaceutically acceptable salt or solvate thereof.

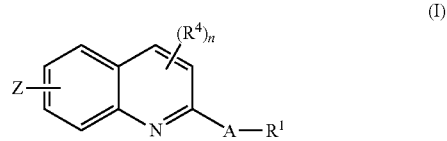

4 Claims, 1 Drawing Sheet

MONOAMINE OXIDASE B IMAGING PROBE

TECHNICAL FIELD

The present invention relates to a monoamine oxidase-B imaging probe which enables differential diagnosis of a wide range of neurological diseases. Specifically, the present invention relates to a quinoline compound derivative substituted by pyridine, a pharmaceutical composition for diagnostic imaging comprising the labeled same compound, and a method for diagnostic imaging using the labeled compound.

BACKGROUND ART

As a diagnostic imaging method for neurodegenerative diseases, a method for detecting a protein specific for respective disease that accumulates in the brain is thought to be useful, and amyloid PET probe or tau PET probe has put into practical use. According to a method for detecting a protein specific for this disease, for example, though a probe for detecting alpha-synuclein is needed in the case of Parkinson's disease (and dementia with Lewy bodies), an alpha-synuclein probe has not been developed yet. Also, though in Amyotrophic Lateral Sclerosis (ALS), TDP-43 as a cause protein is specified, a probe for detecting TDP-43 has not been developed yet in the present stage (Non-Patent Literature 1).

Monoamine oxidase-B (MAO-B) has been found to be present in mainly intracerebral non-neural cells, such as astrocyte and radial glial cells, and monoamine oxidase-B levels have been known to increase depending on age or in association with neurological diseases in both human beings and mice (see Non-Patent Literatures 2 and 3).

On the other hand, it has been known that astrocyte is increased in a variety of neurological diseases such as cerebrovascular disease, traumatic brain injury, and epilepsy in addition to these neurodegenerative diseases (see Non-Patent Literature 4), and also monoamine oxidase-B is expressed in astrocyte (see Non-Patent Literature 5). Accordingly, it is expected that a probe that binds to monoamine oxidase-B specifically or selectively enables one to diagnose each neurological disorder and is also able to comprehend a pathology through a quantification of astrocyte in a wide range of neurological diseases.

Hereto, the present inventor et al. have been found and reported particular compounds useful as tau imaging probe (such as THK-5351) (see Patent Literatures 1 and 2). THK-5351 as the tau PET probe developed by the present inventors showed disease-specific accumulation patterns in frontotemporal lobar degenerations such as Alzheimer's disease, progressive supranuclear palsy, degeneration, semantic Corticobasal dementia and progressive nonfluent aphasia, and a variety of neurodegenerative diseases. However, since an accumulation has been found in corticobasal ganglia where tau histopathology is absent, and high accumulation has been found in semantic dementia where no tau lesion is thought to be appeared, it has been suspected that the same compound shows a binding to a different target from tau protein (see Non-Patent Literature 6). It has been clear by a detailed analysis that the THK-5351 has also a high binding affinity to monoamine oxidase-B (see Patent Literature 3).

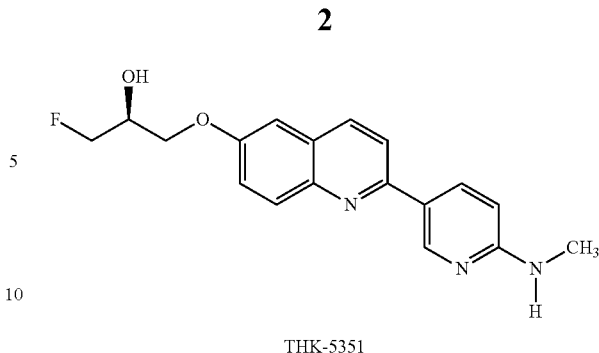

THK-5351

Despite that the THK-5351 has an affinity to monoamine oxidase-B, the same compound has also an affinity to tau, and it binds to monoamine oxidase-B non-selectively. Accordingly, for a quantification of astrocyte, it is required to remove a binding property to tau, and develop a probe showing specific binding property to monoamine oxidase-B.

PRIOR ART DOCUMENT

Patent Document

Patent Documents

[Patent Literature-1]: WO 2012/057312
[Patent Literature-2]: WO 2015/060365
[Patent Literature-3]: WO 2017/103257

Non-Patent Documents

[Non-Patent Literature-1]: Mathis et al., 2017 Semin Nucl Med. 47 (5): 553-575
[Non-Patent Literature-2]: Tong et al., 2013 J Cereb Blood Flow Metab. 33 (6): 863-871
[Non-Patent Literature-3]: Tong et al., 2017 Brain. 140 (9): 2460-2474
[Non-Patent Literature-4]: Rekny et al., 2016 Acta Neuropathol 131:323-345
[Non-Patent Literature-5]: Ekblom et al., 1993 Glia 8:122-132
[Non-Patent Literature-6]: Okamura et al., 2018 Clin Transl Imaging 6:305-316

SUMMARY OF INVENTION

Problems to be Solved by the Invention

An object of the present invention is to provide a compound that has high specificity and selectivity for monoamine oxidase-B, that is, doesn't bind to a misfolding protein such as tau, thereby can show an imaging of monoamine oxidase-B with good sensitivity. Accordingly, an object of the present invention is to provide a monoamine oxidase-B imaging probe that enables diagnosis of a wide range of monoamine oxidase-B related-neurological diseases, and also enables a quantification of astrocyte.

Means for Solving the Problems

In light of the above problems, the present inventors have intensively studied and found that the compound represented by formula (I) (including formula (I')) is a compound that shows high specificity and selectivity for monoamine oxidase-B, doesn't bind to a misfolding protein such as tau, and can give an imaging of monoamine oxidase-B with good sensitivity, and also shows a high brain delivery. Also, the present inventors have found that the compound represented by formula (II) (including the formula (II')) can be used as a precursor of the compound represented by formula (I). As a result, the present inventors et al., have completed the invention of the present application.

That is, the present invention encompasses the following embodiments, and aren't limited thereto.

[1] A compound represented by formula (I):

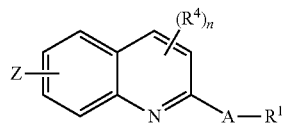
(I)

[wherein
A represents a cyclic group represented by formula:

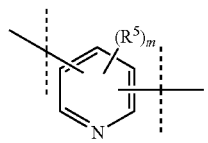

a cycle A may be a non-substituted group, or may be optionally substituted with one or more $R^5$ group, and each $R^5$ represents independently of each other a C1-C6 alkyl group or a C3-C6 cycloalkyl group;
$R^1$ group represents a C1-C6 alkyl group or a C3-C6 cycloalkyl group;
Z represents a group represented by formula:

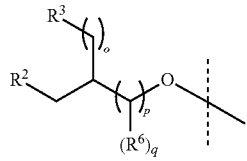

wherein
$R^2$ represents a halogen atom,
$R^3$ represents a hydroxy group,
each $R^6$ represents independently of each other a C1-C6 alkyl group, or a C3-C6 cycloalkyl group,
o is an integer of 0 to 1,
p is an integer of 0 to 1,
q is an integer of 0 to 2;
$R^4$ each represents independently of each other a C1-C6 alkyl group or a C3-C6 cycloalkyl group;
m is an integer of 0 to 3;
n is an integer of 0 to 5; and
each line that the above dotted line intersects with represents a bond to the other structural moiety of the above formula (I),
(hereinafter, referred to as "Compound of the present invention") or a pharmaceutically acceptable salt or solvate thereof.

[2] The compound according to [1] wherein the cycle A represents any cyclic group represented by formulae:

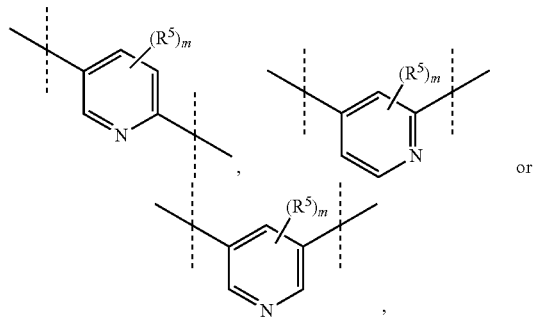

$R^1$ represents a C1-C3 alkyl group;
Z represents a group represented by formula:

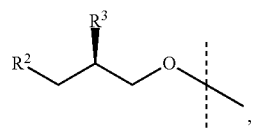

wherein
$R^2$ and $R^3$ are as the same as defined in [1],
$R^4$ and $R^5$ each represents independently of each other a C1-C3 alkyl group;
m is an integer of 0 to 1; and
n is an integer of 0 to 1,
or a pharmaceutically acceptable salt or solvate thereof.

[3] The compound according to [1] wherein a compound represented by formula (I'):

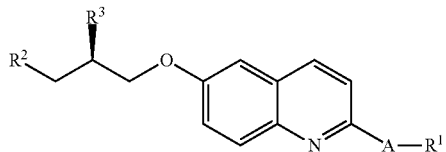
(I')

[wherein
A, $R^1$, $R^2$ and $R^3$ are the same as defined in [1]], or a pharmaceutically acceptable salt or solvate thereof.

[4] The compound according to any one of [1] to [3] wherein a formula (I-1), (I-2) or (I-3):

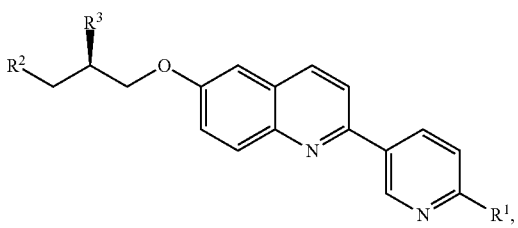

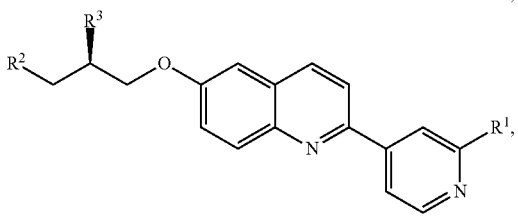

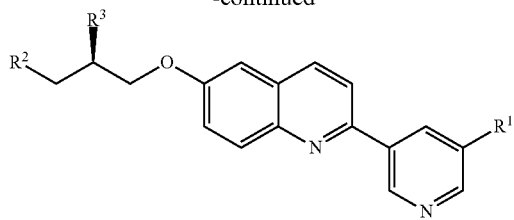

wherein
- $R^1$ represents a C1-C3 alkyl group,
- $R^2$ represents a fluorine atom,
- $R^3$ represents a hydroxy group, or a pharmaceutically acceptable salt or solvate thereof.

[4-2] The compound according to any one of [1] to [3] wherein $R^1$ represents a methyl group or an ethyl group, or a pharmaceutically acceptable salt or solvate thereof.

[4-3] The compound according to any one of [1] to [3] wherein $R^1$ represents a methyl group, or a pharmaceutically acceptable salt or solvate thereof.

[9] The compound according to [8] wherein the compound is selected from the group consisting of the following compounds:

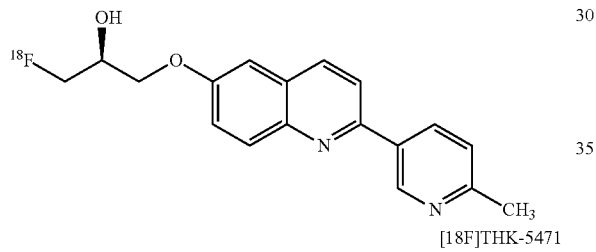

[18F]THK-5470

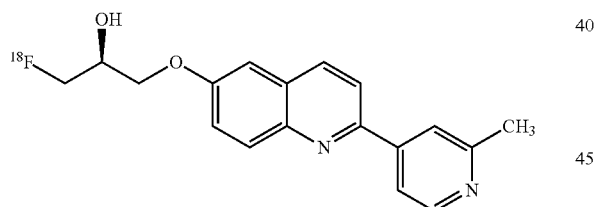

[18F]THK-5471

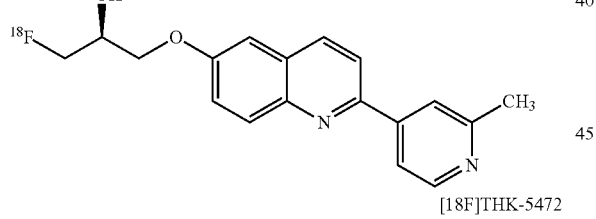

[18F]THK-5472

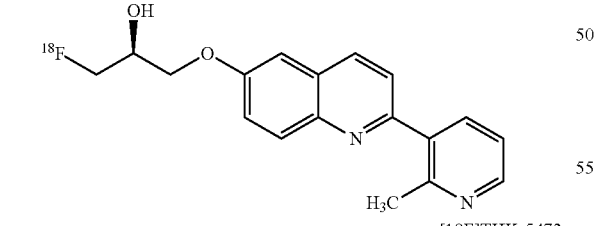

[18F]THK-5473

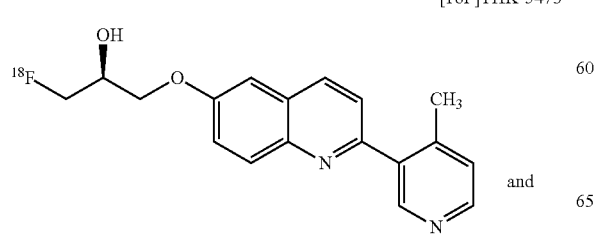

and

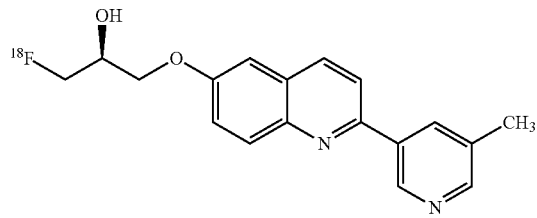

[18F]THK-5474 or a pharmaceutically acceptable salt or solvate thereof.

[6] The compound according to any one of [1] to [5] wherein the compound is labeled with any one of radioactive nuclides or a positron emitting nuclide, or a pharmaceutically acceptable salt or solvate thereof.

[7] The compound according to [6] wherein a positron emitting nuclide is selected from a group consisting of $^{11}C$, $^{13}N$, $^{15}O$, $^{18}F$, $^{34m}Cl$, $^{76}Br$, $^{45}Ti$, $^{48}V$, $^{60}Cu$, $^{61}Cu$, $^{62}Cu$, $^{64}Cu$, $^{66}Ga$, $^{89}Zr$, $^{94m}Tc$, and $^{124}I$, or a pharmaceutically acceptable salt or solvate thereof.

[7-2] The compound according to [6] wherein a positron emitting nuclide is $^{11}C$ or $^{18}F$, or a pharmaceutically acceptable salt or solvate thereof.

[8] The compound according to any one of [1] to [7] wherein $R^2$ represents $^{18}F$, or a pharmaceutically acceptable salt or solvate thereof.

[9] The compound according to [8] wherein the compound is selected from the group consisting of the following compounds:

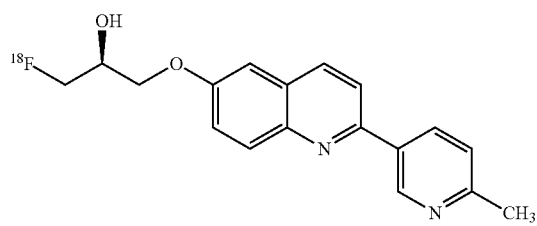

THK-5470

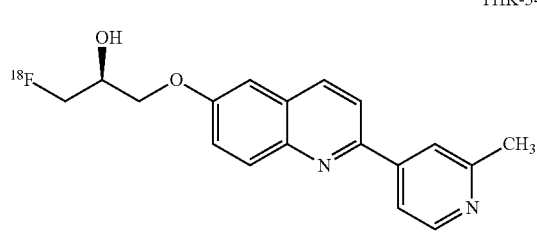

THK-5471

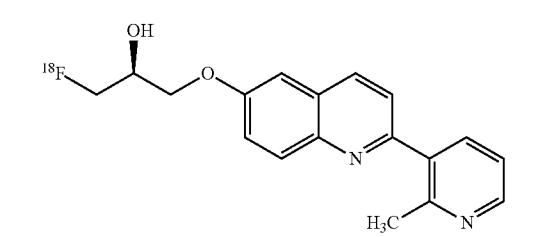

THK-5472

-continued

THK-5473

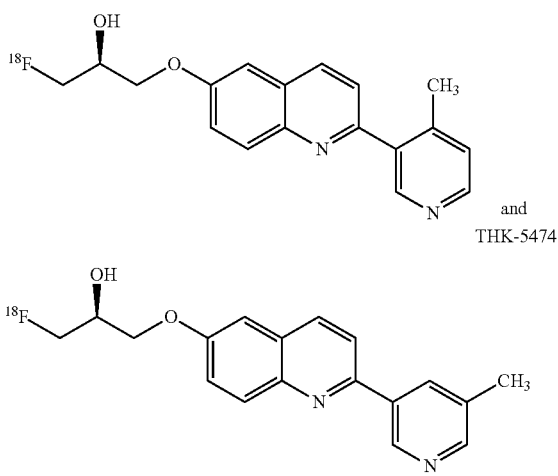

and

THK-5474 or a pharmaceutically acceptable salt or solvate thereof.

(Diagnostic Imaging)

[10] A pharmaceutical composition for diagnostic imaging of monoamine oxidase-B related-neurological disorder, which comprises the compounds according to any one of [1] to [9] (for example, [6] to [9]) or a pharmaceutically acceptable salt or solvate thereof, and a pharmaceutically acceptable carrier.

[10-2] The pharmaceutical composition for diagnostic imaging according to [10], for differential imaging of monoamine oxidase-B related-neurological disorder.

[11] A kit for diagnostic imaging of monoamine oxidase-B related-neurological disorder, which comprises as an essential constitute element the compound according to any one of [1] to [9] (for example, [6] to [9]) or a pharmaceutically acceptable salt or solvate thereof (Monoamine Oxidase-B Related-Neurological Diseases)

[12] The pharmaceutical composition for diagnostic imaging according to or the kit for diagnostic imaging according to [11], wherein monoamine oxidase-B related-neurological disorder is one or more diseases selected from the group consisting of Alzheimer's disease, Parkinson's disease, progressive supranuclear palsy, Corticobasal degeneration, multiple-system atrophy, amyotrophic lateral sclerosis (ALS), frontotemporal lobar degeneration, Huntington's disease, Alexander's disease, cerebrovascular disease, traumatic brain injury, central nervous system infection, epilepsy, schizophrenia, and major depression.

[12-2] A pharmaceutical composition for treatment and/or prevention of monoamine oxidase-B related-neurological disorder, which comprises the compound according to any one of [1] to [5], or pharmaceutically acceptable salt or solvate, and a pharmaceutically acceptable carrier.

[12-3] The pharmaceutical composition according to [12-2] wherein the monoamine oxidase-B related-neurological diseases is one or more diseases selected from the group consisting of Alzheimer's disease, Parkinson's disease, progressive supranuclear palsy, Corticobasal degeneration, multiple-system atrophy, amyotrophic lateral sclerosis (ALS), frontotemporal lobar degeneration, Huntington's disease, Alexander's disease, cerebrovascular disease, traumatic brain injury, central nervous system infection, epilepsy, schizophrenia, and major depression.

(Diagnostic Imaging Method)

[13] A diagnostic imaging of monoamine oxidase-B related-neurological disorder in a subject, which comprises applying the compound according to any one of [1] to [9] (for example, [6] to [9]) or a pharmaceutically acceptable salt or solvate thereof to a subject.

[13-2] A diagnostic imaging method which comprises detecting and dyeing monoamine oxidase-B in a sample by dyeing a sample with the compound according to any one of [1] to [9] (for example, [6] to [9]) or a pharmaceutically acceptable salt or solvate thereof.

[13-3] Use of the compound according to any one of [1] to [9] (for example, [6] to [9]) or a pharmaceutically acceptable salt or solvate thereof in a preparation of a pharmaceutical composition or kit for diagnostic imaging of monoamine oxidase-B related-disease in a subject.

[13-4] Use of the compound according to any one of [1] to [9] (for example, [6] to [9]) or a pharmaceutically acceptable salt or solvate thereof in a preparation of a pharmaceutical composition or kit for diagnostic imaging, which is for detecting and dyeing monoamine oxidase-B.

(Preparation Process and Intermediate Compound)

[14] A compound represented by formula (II'):

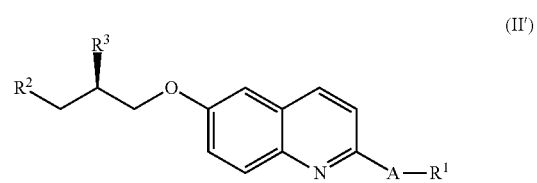

(II')

[wherein
A and $R^1$ are the same as defined in [1],
$R^2$ represents a leaving group, and
$R^3$ represents a protecting group for a hydroxy group],
or a pharmaceutically acceptable salt or solvate thereof (hereinafter, referred to as "Precursor").

[14-2] The compound according to or a pharmaceutically acceptable salt or solvate thereof wherein $R^2$ represents a methanesulfonyloxy group (mesyloxy; Ms-O—) group, a trifluoromethanesulfonyloxy group (Tf-O—) group, or p-toluenesulfonyloxy (Ts-O—) group, preferably p-toluenesulfonyloxy (Ts-O—) group.

[14-3] The compound according to or [14-2], or a pharmaceutically acceptable salt or solvate thereof wherein $R^3$ represents a 2-tetrahydropyranyl (THP) group, or t-butyldimethylsilyl (TBS) group, preferably a 2-tetrahydropyranyl (THP) group.

[15] A method for preparing the compound represented by formula (I) according to [1] to [5], which comprises the following steps:

Step (i): a compound represented by formula (III):

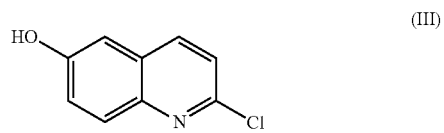 [SMILES: Oc1ccc2nc(Cl)ccc2c1]

(III)

is subjected to Mitsunobu reaction with (R)-(+)-glycidol to obtain a compound represented by formula (IV):

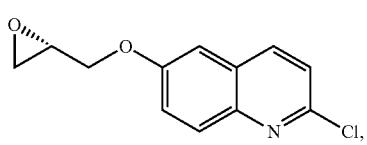

(IV)

Step (ii): the compound represented by formula (III) is reacted with a fluorination reagent and a reduction reagent to obtain a compound represented by formula (V):

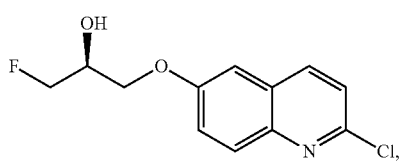

(V)

and

Step (iii): the compound represented by formula (V) is reacted with a compound represented by formula (VI) or formula (VII):

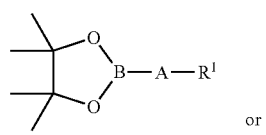

(VI)

or

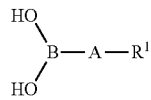

(VII)

[wherein, A and R¹ are the same as defined in the above [1]) to obtain a compound represented by formula (I'):

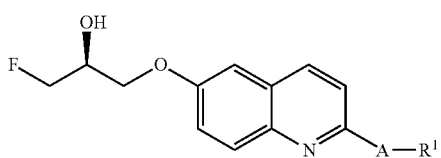

(I')

[wherein, A and R¹ are the same as defined in the above [1]).

[16] A method for preparing the compound according to any one of [1] to [5], which comprises the following steps:

Step (i): a compound represented by formula (III):

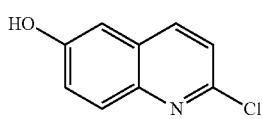

(III)

is reacted with a compound represented by formula (VI) or (VII):

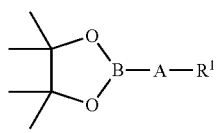

(VI)

or

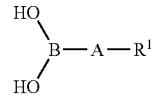

(VII)

[wherein, A and R¹ are the same as defined in the above [1]) to obtain a compound represented by formula (VIII):

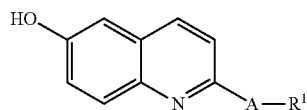

(VIII)

[wherein A and R¹ are the same as defined above],

Step (ii): the compound represented by formula (VIII) reacted with a compound represented by formula (IX):

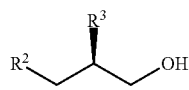

(IX)

[wherein
R² is the same as defined in [14], and
R³ represents OTBS]
to obtain a compound represented by formula (II'):

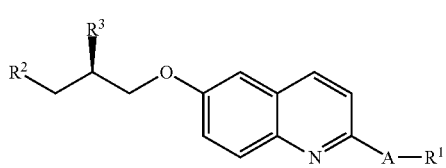

(II')

[wherein
R² is the same as defined in [14], and
R³ represents OTBS.],

Step (iii): the compound represented by formula (II') is reacted with a trifluoroacetic acid to deprotect a OTBS group, followed by reacting with 3,4-dihydro-2H-pyrane to convert R³ into OTHP group, Step (iv): the OTHP group as $R^3$ in the compound obtained in the step (iii) is deprotected to convert $R^3$ into a hydroxy group;

Step (v): the leaving group as $R^2$ in the compound obtained in the step (iv) is reacted with a fluorination reagent to prepare a compound represented by formula (I'):

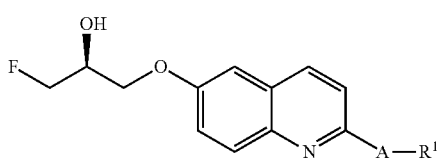

(I')

[wherein A and $R^1$ are the same as defined in the above [1]).

Effects of the Invention

The present invention can provide a compound having high specificity and selectivity for monoamine oxidase-B, as well as a precursor thereof. The compound of the present invention has high brain delivery, and low or low or non-recognized bone-seeking properties. Accordingly, monoamine oxidase-B imaging probe that enables a diagnostic imaging of each of monoamine oxidase-B related-neurological disorder, or a quantification of astrocyte can be obtained by using the compound of the present invention.

MODE FOR CARRYING OUT THE INVENTION

Definitions

Figure 1:
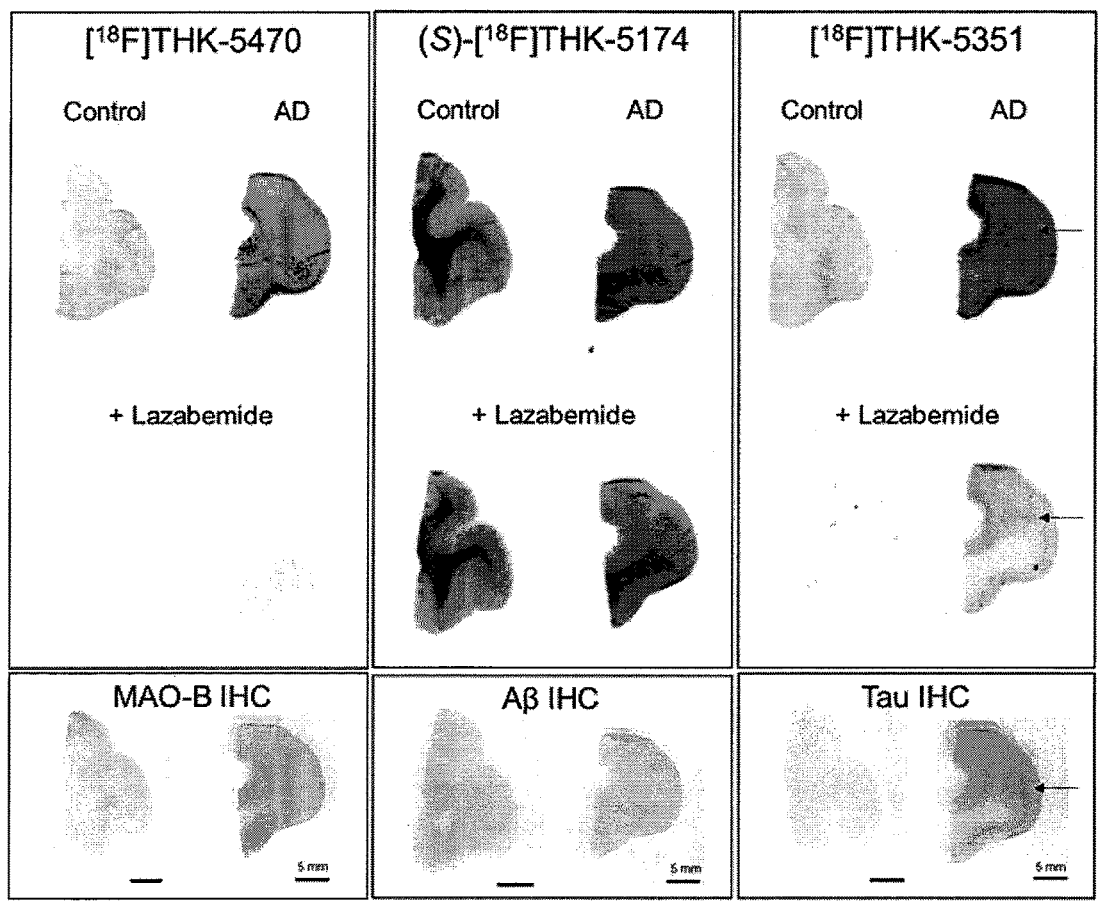
FIG. 1 is a diagram showing In vitro autoradiography image of human brain autopsy, and a staining of MAO-B, Aβ, and tau immunity (IHC; immunohistochemistry) in adjacent section by using the compound of the present invention ((S)-[$^{18}$F] THK-5470), and control compound ((S)-[$^{18}$F] THK-5174, or(S)-[$^{18}$F] THK-5351). An arrow symbol means a binding to tau.

The compound of the present invention refers to the compound represented by formula (I) described below (including formula (I'), formula (I-1), formula (I-2) and formula (I-3)), or salts or solvates thereof. When "the compound of the present invention" and "compound according to the present invention" is referred to herein, it encompasses the compound represented by formula (I) described below, and salts and solvates thereof, unless otherwise specified.

The "C1-C6 alkyl group" as used herein refers to an alkyl group having 1 to 6 carbon atoms which has a straight or branched chain, and specifically, includes methyl group, ethyl group, propyl group, isopropyl group, butyl group, isobutyl group, sec-butyl group, tert-butyl group, pentyl group, isopentyl group, neopentyl group, 1,1-dimethylpropyl group, 1-methylbutyl group, 2-methylbutyl group, 3-methylbutyl group, 1,2-dimethylpropyl group, hexyl group, isohexyl group, 1-methylpentyl group, 2-methylpentyl group, 3-methylpentyl group, 1,1-dimethylbutyl group, 1,2-dimethylbutyl group, 2,2-dimethylbutyl group, 1,3-dimethylbutyl group, 2,3-dimethylbutyl group, 3,3-dimethylbutyl group, 1-ethylbutyl group, 1,2,2-trimethylpropyl group, 1-ethyl-2-methylpropyl group and the others. A C1-C6 alkyl group include preferably C1-C4 alkyl group, and more preferably C1-C3 alkyl group. Methyl group or ethyl group is further more preferably included, and methyl group is particularly preferably included.

The "C3-C6 cycloalkyl group" as used herein represents a cyclic alkyl group having 3 to 6 carbon atoms, and specifically includes cyclopropyl group, cyclobutyl group, cyclopentyl group, and cyclohexyl group.

The "halogen" as used herein represents fluorine atom, chlorine atom, bromine atom or iodine atom. Fluorine atom or chlorine atom is preferably included, and fluorine atom is particularly preferably included.

The "monoamine oxidase" as used herein represents an enzyme that promotes oxidative metabolism of monoamines as neurotransmitter (such as dopamine, tyramine, noradrenaline, serotonin, and adrenaline). In human beings, examples of monoamine oxidase include monoamine oxidase A (abbreviated as "MAO-A") and monoamine oxidase B (abbreviated as "MAO-B").

The astrocyte containing "monoamine oxidase-B (MAO-B)" involves in a change of a variety of neurological functions, and accordingly, involves in pathology of neurological diseases.

A relationship between neurological diseases, monoamine oxidase-B and astrocyte has been reported in the following literature (see Pekny et al., 2016 Acta Neuropathol 131:323-345, Tong et al., 2017. Brain; 140. 2460-2474)

For example, for Alzheimer's disease, an increase of expression level of monoamine oxidase-B in cerebral cortex such as temporal lobe is observed (see Gulyas et al., 2011 Neurochem Int; 58 (1): 60-68).

Also for parkinson's disease, a remarkable increase of monoamine oxidase-B level in frontal cortex is observed (see Tong et al., 2017. Brain; 140. 2460-2474).

Also, for progressive supranuclear palsy (progressive supranuclear palsy; PSP), a remarkable increase of monoamine oxidase-B level in caudate, putamen, frontal cortex, and substantia nigra (see Tong et al., 2017. Brain; 140. 2460-2474).

Also for multiple-system atrophy (Multiple system atrophy; MSA), a remarkable increase of monoamine oxidase-B level in putamen, and a mild increase of monoamine oxidase-B level in substantia nigra are observed (see Tong et al., 2017. Brain; 140. 2460-2474).

Further, for amyotrophic lateral sclerosis, a remarkable increase of monoamine oxidase-B level in ventral horn and corticospinal tract are observed (see Ekblom et al., 1993. Glia; 8.122-132).

Accordingly, a difference in a localization of spatial distribution of monoamine oxidase-B imaging probe (=spatial distribution of astrocyte) in vivo enables a diagnosis of each neurological disease, and besides enables a differential diagnosis of a wide range of neurological diseases.

An increase of astrocyte is observed in a wide variety of diseases such as traumatic brain injury, cerebrovascular disease, central nervous system infection, and epilepsy other than neurological diseases. Also in mental diseases such as schizophrenia and major depression, abnormalities of astrocyte have been pointed out, and a quantification of astrocyte also enables a comprehension of a pathology of these diseases.

The "neurological diseases" as used herein represents a disease wherein among neurons existing in brain or spinal cord, a particular neuron group (for example, neurons related to cognitive function or neurons related to motor function) is damaged, and accordingly, a dysfunction is caused. Specific examples of neurological diseases include Alzheimer's disease, Parkinson's disease, progressive supranuclear palsy, Corticobasal degeneration, multiple-system atrophy, amyotrophic lateral sclerosis, frontotemporal lobar degeneration, Huntington's disease, Alexander's disease, cerebrovascular disease, traumatic brain injury, central nervous system infection, epilepsy, schizophrenia, and major depression, and aren't limited thereto.

(Compound of the Present Invention)

The compound of the present invention is explained.

According to one embodiment of the compound of the present invention, the present invention provides a compound represented by formula (I):

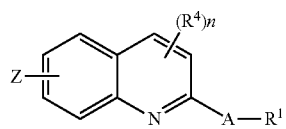

(I)

[wherein
A represents a cyclic group represented by formula:

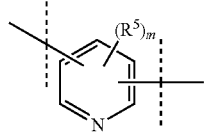

a cycle A may be a non-substituted group, or may be optionally substituted with one or more $R^5$ group, and each $R^5$ represents independently of each other a C1-C6 alkyl group or a C3-C6 cycloalkyl group;
$R^1$ group represents a C1-C6 alkyl group or a C3-C6 cycloalkyl group;
Z represents a group represented by formula:

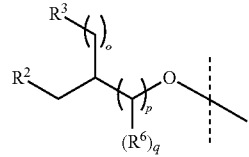

wherein
$R^2$ represents a halogen atom,
$R^3$ represents a hydroxy group,
each $R^6$ represents independently of each other a C1-C6 alkyl group, or a C3-C6 cycloalkyl group,
o is an integer of 0 to 1,
p is an integer of 0 to 1,
q is an integer of 0 to 2;
$R^4$ each represents independently of each other a C1-C6 alkyl group or a C3-C6 cycloalkyl group;

m is an integer of 0 to 3;
n is an integer of 0 to 5; and
each line that the above dotted line intersects with represents a bond to the other structural moiety of the above formula (I),
which shows a high specificity and selectivity for monoamine oxidase-B,
or a pharmaceutically acceptable salt or solvate thereof.

In the formula (I), A represents a cyclic group represented by formula:

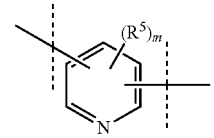

wherein each line that the above dotted line intersects with represents a bond to the other structural moiety of the above formula (I). Namely, in the above-mentioned formula, each bond represents a linking group with quinoline, or a linking group with $R^1$ group, respectively, as shown in the below-mentioned formula. For example, as shown in the below-mentioned formula,

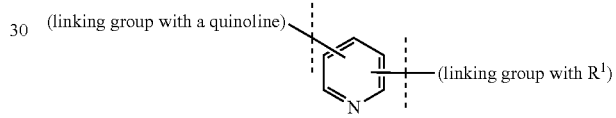

the binding at left side links a quinoline, whereas the binding at right side links $R^1$ group.

The cycle A may be non-substituted, or may be appropriately substituted with one or more $R^5$ group, and each $R^5$ group represents independently a C1-C6 alkyl group or a C3-C6 cycloalkyl group.

According to one embodiment of the compound of the present invention, A represents preferably any cyclic group represented by the following formula.

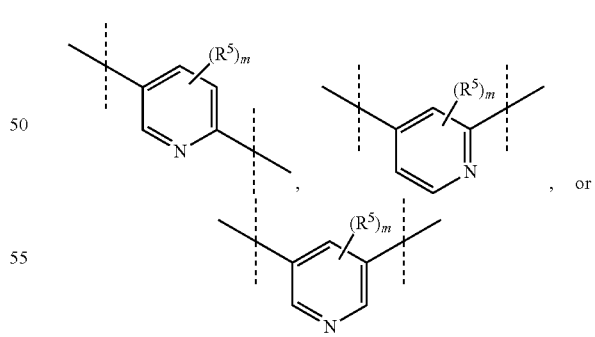

According to one embodiment of the compound of the present invention, the cycle A may be non-substituted, or may be appropriately substituted with one or more (for example, one to three, preferably one) substituent $R^5$.

According to one embodiment of the compound of the present invention, the substituent $R^5$ represents independently of each other a C1-C6 alkyl group or a C3-C6 cycloalkyl group.

According to one embodiment of the compound of the present invention, the substituent $R^5$ represents independently of each other a C1-C6 alkyl group, for example, a C1-C3 alkyl group.

According to one embodiment of the compound of the present invention, the substituent $R^5$ is absent, and the cycle A is non-substituted.

According to one embodiment of the compound of the present invention, in the formula, $R^1$ group represents a C1-C6 alkyl group or a C3-C6 cycloalkyl group, and preferably a C2-C6 alkyl group, more preferably a C1-C3 alkyl group, and further more preferably a C1-C2 alkyl group, and particularly preferably methyl group.

According to one embodiment of the compound of the present invention, in the formula, Z group represents a group represented by formula:

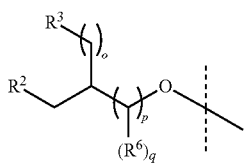

wherein
$R^2$ represents a halogen atom,
$R^3$ represents a hydroxy group,
$R^6$ represents independently of each other a C1-C6 alkyl. group or a C3-C6 cycloalkyl group,
o is an integer of 0 to 1,
p is an integer of 0 to 1, and
q is an integer of 0 to 2.

According to one embodiment of the compound of the present invention, $R^6$ group is absent, or each $R^6$ group represents independently a C1-C6 alkyl group. When $R^6$ group is present, the $R^6$ group represents preferably a C1-C3 alkyl group.

According to one embodiment of the compound of the present invention, when q is an integer of 0, and then o is an integer of 0 and p is an integer of 1, or then o is an integer of 1 and p is an integer of 0, Z preferably presents. Specifically, Z group represents preferably a group represented by formula:

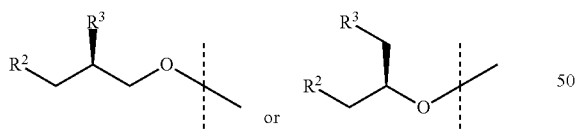

[wherein $R^2$ and $R^3$ are the same as defined in the above-mentioned formula (I)].

Z group represents more preferably a group represented by formula:

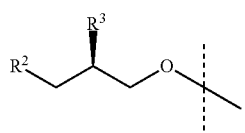

[wherein $R^2$ and $R^3$ are the same as defined in the above-mentioned formula (I)].

Here according to one embodiment of the compound of the present invention, a symbol of "*" in the formula indicates a chiral center of asymmetric carbon, which means S-form.

According to one embodiment of the compound of the present invention, $R^4$ is absent, or represents independently of each other a C1-C6 alkyl group, or a C3-C6 cycloalkyl group.

According to one embodiment of the compound of the present invention, the substituent $R^5$ represents independently of each other a C1-C6 alkyl group, for example, a C1-C3 alkyl group.

According to one embodiment of the compound of the present invention, o is an integer of 0 to 1, and o is preferably 0.

According to one embodiment of the compound of the present invention, p is an integer of 0 to 1, and p is preferably 1.

According to one embodiment of the compound of the present invention, q is an integer of 0 to 2, and q is preferably 0.

According to one embodiment of the compound of the present invention, m is the number of $R^5$ substituent on pyridine ring, and is an integer of 0 to 3, and m is preferably an integer of 0 to 1, and m is more preferably an integer of 0.

According to one embodiment of the compound of the present invention, n is the number of $R^4$ substituent on quinoline ring, and is an integer of 0 to 5, and n is preferably an integer of 0 to 1, and n is more preferably an integer of 0.

According to one embodiment of the compound of the present invention, in the formula (I), A group represents any cyclic group represented by formula:

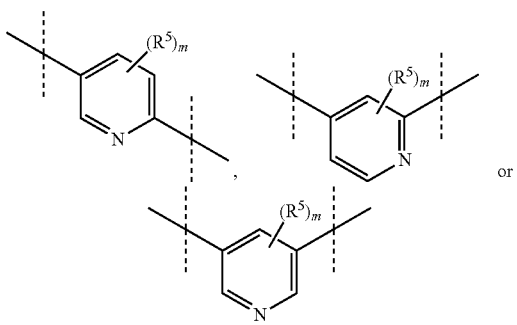

$R^1$ represents a C1-C3 alkyl group;
Z group represents a group represented by formula:

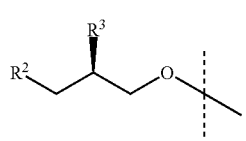

in the formula,
$R^2$ represents a halogen atom,
$R^3$ represents a hydroxy group, R[4] and R[5] represent independent of each other a C1-C3 alkyl group, m is an integer of 0 to 1; and n is an integer of 0 to 1, or a pharmaceutically acceptable salt or solvate thereof.

According to one embodiment of the compound of the present invention, a compound represented by formula (I″):

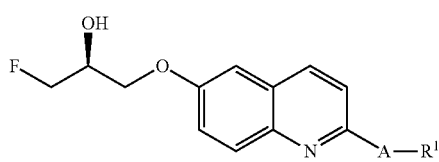

(I″)

[wherein

A and R[1] are the same as defined in the above-mentioned formula (I)]

or a pharmaceutically acceptable salt or solvate thereof.

According to one embodiment of the compound of the present invention, a compound represented by formula (I-1), (I-2) or (I-3):

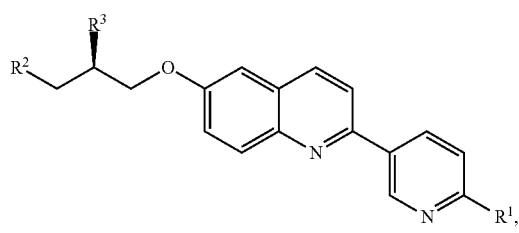

(I-1)

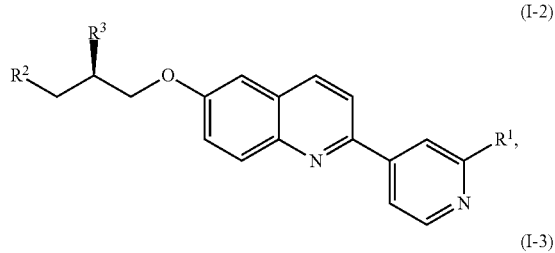

(I-2)

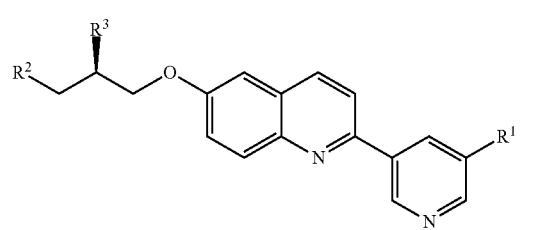

(I-3)

wherein

R[1] represents a C1-C3 alkyl group,

R[2] represents a fluorine atom, and

R[3] represents a hydroxy group, or a pharmaceutically acceptable salt or solvate thereof.

According to one embodiment of the compound of the present invention, examples of the specific compounds include selected from the group consisting of the 10 the compounds following compounds:

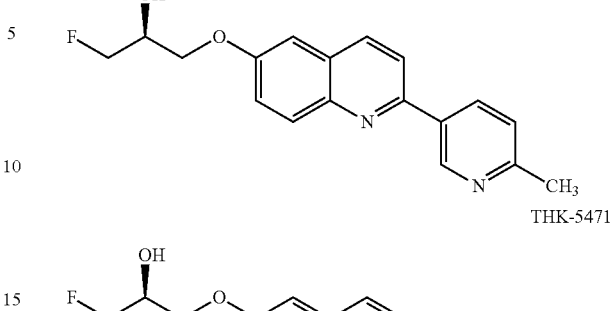

THK-5470

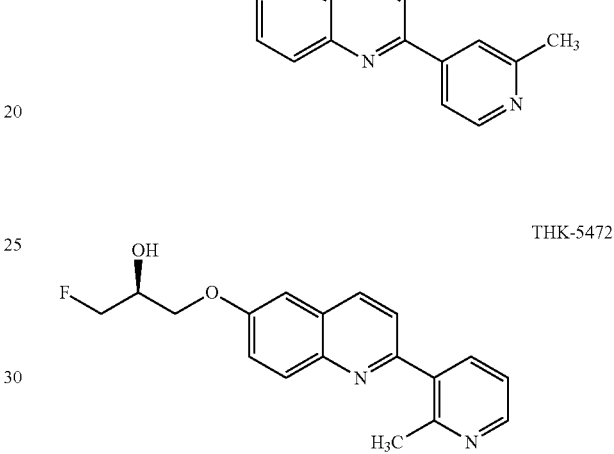

THK-5471

THK-5472

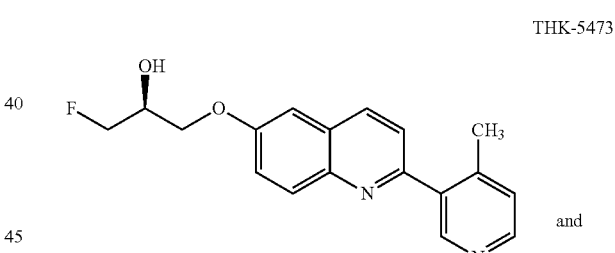

THK-5473 and

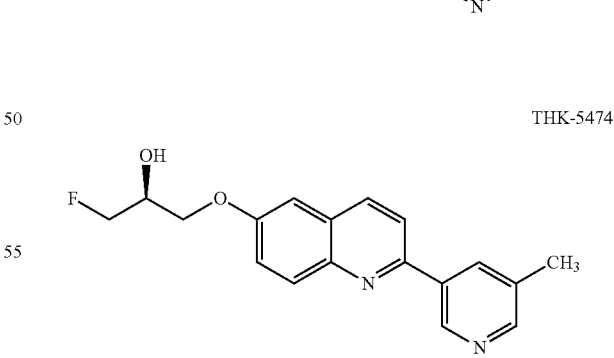

THK-5474 or a pharmaceutically acceptable salt or a solvate thereof, but aren't limited thereto.

According to one embodiment of the compound of the present invention, examples of the preferred specific compounds include the compounds selected from the group consisting of the following compounds:

THK-5470

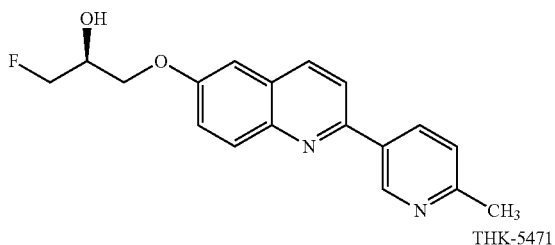

THK-5471

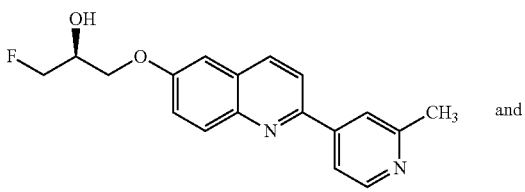
and

THK-5474

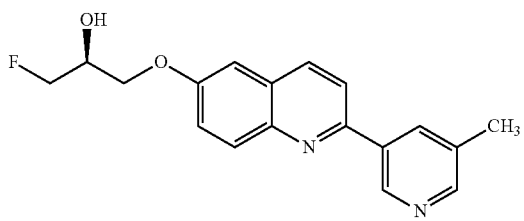

or a pharmaceutically acceptable salt or a solvate thereof.

According to one embodiment of the compound of the present invention, examples of the particularly preferred specific compounds include the following compounds:

THK-5470

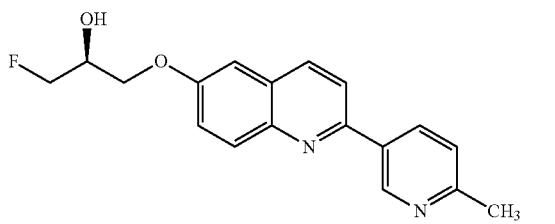

or a pharmaceutically acceptable salt or a solvate.

As the compound of the present invention, the compound represented by formula (I) has the following requirements that is necessary to be useful as a probe for imaging monoamine oxidase (MAO-B) wherein the probe is useful in using in vivo.

1. The compound binds to MAO-B with high specificity and selectivity for MAO-B.
2. The compound hardly bind to any enzymes other than MAO-B (particularly, MAO-A) or any receptors.
3. The compound doesn't bind to any misfolding protein such as tau.
4. The probe administered intravenously to living body readily passes through blood barrier and brain barrier and then transits to brain.
5. The probes transited to brain binds to MAO-B.
6. The probes not binding to MAO-B washes out significantly rapidly from a brain.

Accordingly, a difference in a localization of spatial distribution of monoamine oxidase-B imaging probe (=spatial distribution of astrocyte) in vivo enables a diagnosis of a wide range of neurological diseases, and also a qualification of astrocyte.

Particularly, the compound of formula (I) of the present invention is suitable for a diagnosing imaging for a binding to monoamine oxidase-B, particularly a diagnostic imaging using PET. Accordingly, the compound of formula (I) can be used for an accurate findings or diagnosis at an early stage, or an effective treatment or prophylaxis for neurological diseases which are related to an increase of monoamine oxidase-B (such as Alzheimer's disease, Parkinson's disease, progressive supranuclear palsy, Corticobasal degeneration, multiple-system atrophy, amyotrophic lateral sclerosis, frontotemporal lobar degeneration, Huntington's disease, Alexander's disease, cerebrovascular disease, traumatic brain injury, central nervous system infection, epilepsy, schizophrenia, major depression and the others).

(Precursor)

The precursor in the present invention is explained.

Next, as a precursor for the compound represented by formula (I) which is the compound of the present invention, a compound represented by formula (II):

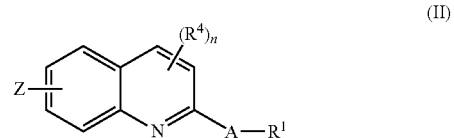

(II)

wherein
A represents a formula:

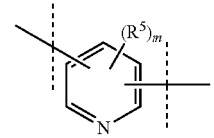

[wherein
Cycle A and $R^5$ are the same as defined in the above-mentioned formula (I),
$R^1$ is the same as defined in the above-mentioned formula (I),
Z represents a group represented by formula:

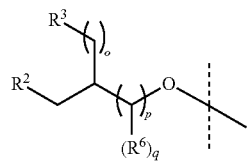

[wherein
$R^2$ represents a halogen atom or a leaving group,
$R^3$ represents a hydroxy group or a protecting group for hydroxy group,
with the proviso that when $R^2$ represents a halogen atom, $R^3$ doesn't represent a hydroxy group;
$R^6$, o, p and q are the same as defined in the above-mentioned formula (1)]; and
$R^4$, m and n are the same as defined in the above-mentioned formula (1), or a pharmaceutically acceptable salt or solvate thereof are included.

The term of "leaving group" as used herein represents a functional group that works as a leaving group against a nucleophilic substitution by fluorine anion, and includes, for example, p-toluenesulfonyloxy group (OTs), methanesulfonyloxy group (OMS), chloro methanesulfonyloxy group, trifluoromethanesulfonyloxy group and the others, but isn't limited thereto.

The term of "protecting group for a hydroxy group" as used herein represents a protecting group that has a resistance against a nucleophilic substitution by fluorine anion and may be removed under acidic or alkali condition, and includes, for example, 2-tetrahydropyranyl (2-THP) group, methoxymethyl group, 2-methoxyetoxymethyl group, ethoxyethyl group, acetyl group, and pivaloyl group and the others, but isn't limited thereto.

According to one embodiment of the precursor of the present invention, among the compound represented by formula (II), the compound wherein when $R^2$ represents a halogen atom or a leaving group, $R^3$ represents a protecting group for hydroxy, and the compound wherein when $R^2$ represents a leaving group, $R^3$ represents a hydroxy group or a protecting group for hydroxy group are included.

According to one embodiment of the precursor of the present invention, among the compound represented by formula (II), the compound wherein $R^2$ represents a leaving group, and $R^3$ represents a hydroxy group is included.

According to one embodiment of the precursor of the present invention, the compound represented by the following formula (II'):

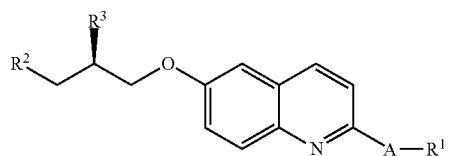

(II')

[wherein
A and $R^1$ are the same as defined in the above formula (1),
$R^2$ is a leaving group, and
$R^3$ represents a protecting group for hydroxy group, or a pharmaceutically acceptable salt or solvate thereof are included.

According to one embodiment of the present application, in the formula (II) or formula (II'), $R^2$ represents methanesulfonyloxy group (mesyloxy; Ms-O—), trifluoromethanesulfonyloxy group (Tf-O—), and p-toluenesulfonyloxy group (Ts-O—), and preferably represents p-toluenesulfonyloxy group (Ts-O—).

According to one embodiment of the present application, in the formula (II) or the formula (II'), $R^3$ represents 2-tetrahydropyranyl (THP) group, or t-butyldimethylsilyl (TBS) group, and preferably 2-tetrahydropyranyl (THP).

As specific compounds of the compounds represented by formula (II) or formula (II') that are the precursor of the present invention, any compounds selected from the group consisting of the following compounds:

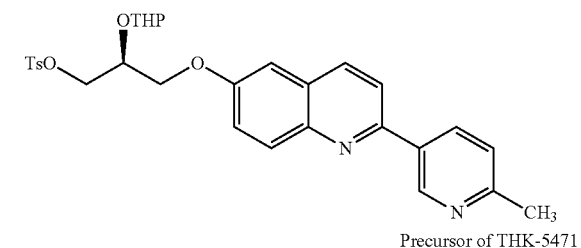

Precursor of THK-5470

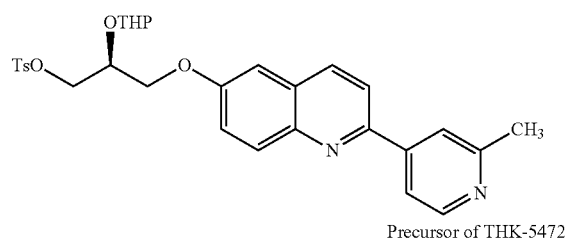

Precursor of THK-5471

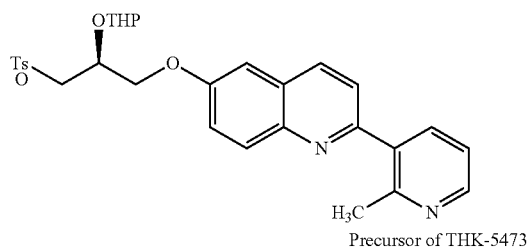

Precursor of THK-5472

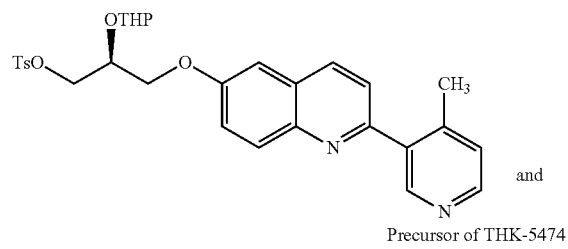

Precursor of THK-5473

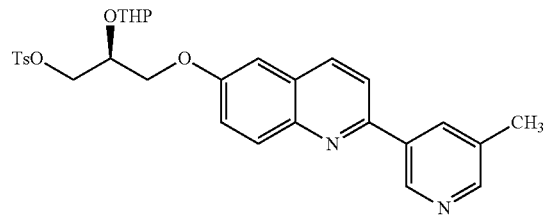

Precursor of THK-5474 and

Precursor of THK-5474 or pharmaceutically acceptable salts or solvates thereof are included, but aren't limited thereto.

The compound of formula (II) can be used as a precursor for synthesizing the compound of formula (I). The method for converting the compound of formula (II) into the compound of formula (I) are well known to a person skilled in the art, and accordingly, the compound of formula (I) can be easily obtained.

The salts of the compound of the present invention are also encompassed by the present invention. The salts can be prepared by using the compounds provided by the present invention (that is, including formula (I'), formula (I-2), or formula (I-3)) according to usual method.

Specifically, when the above-mentioned compound of formula (I) contains, for example, basic groups that are derived from amino group, and pyridine group in a molecule of the compounds, the compounds can be treated with an acid to convert into the corresponding salts.

Examples of "pharmaceutically acceptable salt" as used herein include acid addition salts or base addition salts.

When the compound of the present invention or the precursor contains a basic group in the structural formula, examples of the acid addition salt include the following acid addition salts, that is, hydro halide salts such as hydrochloride, hydrofluoride, hydrobromide and hydroiodide; inorganic acid salts such as nitrate, perchlorate, sulfate, phosphate and carbonate; lower alkyl sulfonic acid salts such as methanesulfonate, trifluoromethanesulfonate and ethanesulfonate; aryl sulfonic acid salts such as benzenesulfonate and p-toluenesulfonate; organic acid salts such as fumarate, succinate, citrate, tartrate, oxalate and maleate; and organic acid salts; and organic acid salts with amino acid, such as glutamate and aspartate.

Also, in the case where the compound of the present invention or the precursor has an acidic group such as a carboxyl group in the structural formula, for the base addition salts, when a carboxyl group is contained, the compound or the precursor can be converted into a corresponding pharmaceutically acceptable salt by treating the compound by a base. Also, examples of the base addition salts include base addition salts such as alkali metal salts such as sodium and potassium; alkaline earth metal salts such as calcium and magnesium; ammonium salts; and base addition salts with organic bases such as guanidine, triethylamine and dicyclohexylamine.

Furthermore, the compound of the present invention may be present as a free compound, or arbitrary hydrate or solvate of a salt thereof.

In starting compounds and precursors which are converted into the compounds of the present invention by the method in the present description, existing functional groups such as amino, thiol, carboxyl and hydroxy groups may be optionally protected with a common conventional protecting group in preparative organic chemistry. Then the protected amino, thiol, carboxyl and hydroxy groups can be converted into free amino, thiol, carboxyl and hydroxy groups under mild conditions without causing breakage of a molecular framework or the other undesirable minor reaction.

The protecting group is inserted so as to protect the functional group from an undesirable reaction with a reaction component under the conditions used to perform a desired chemical conversion. Necessity and selection of the protecting group for a specific reaction are known to those skilled in the art, and depend on properties of the functional group to be protected (hydroxy group, amino group, etc.), structure and stability of the molecule with the substituent constituting a part thereof, and reaction conditions. Examples of the protecting group include OTs, OTHP, methoxymethyl and OAc. The protecting group is preferably a protecting group which is eliminated under acidic conditions.

In the degonosis of monoamine oxidase-B (MAO-B) related-neurological diseases, the compound of the present invention can be used as a probe without labeling. For example, it may be examined whether or not there are any portios stainned by contacting some biopsy samples with the compound of the present invention. However, is is general that the labeled compound of the present invention is used as a diagnostic probe of monoamine oxidase-B (MAO-B) related-neurological diseases. As a label, a fluorescent substance, an affinity substance, an enzymatic substance, and a radioactive nuclide and so on is included. In diagnostic imaging of monoamine oxidase (MAO-B) related-neurological diseases, a probe labeled with radioactive nuclide is usually used. According to a method that is well-known in the field to which the present invention pertains, the compound of the present invention can be labeled with various of radioactive nuclides according to the well-known method in the field to which the present invention pertains. For example, $^3H$, $^{14}C$, $^{35}S$, or $^{131}I$ and so on are radioactive nuclide that have been used since before, which are often used in vitro. As a general requirement requiring for a diagnostic imaging probe and a detection measure thereof, it is included a possible diagnostic imaging in vivo, a low damage to a patient (particularly, being non-invasive), a high sensitivity of detection, and an appropriate length of half-life (for example, a duration for preparing a labeled probe and a diagnostic duration are appropriate). Then a positron computerized tomography (PET) utilizing Gamma rays or a computed tomography (SPECT) with Gamma rays emitting nuclide, both of which showing high detection sensitivity and substance permeability, have been used recently. Among them, as PET detects two γ rays that are radiated to the opposite direction from each other with a pair of detectors according to the coincidence method, it is preferred to obtain excellent information about resolving power or quantitativity. For SPECT, the compound of the present invention can be labeled with a γ rays emitting nuclide such as $^{99m}Tc$, $^{111}In$, $^{67}Ga$, $^{201}Tl$, $^{123}I$, and $^{133}Xe$. $^{99m}Tc$ and $^{123}I$ are often used for SPECT. For PET, the compound of the present invention can be labeled with a positron emitting nuclide such as $^{11}C$, $^{13}N$, $^{15}O$, $^{18}F$, $^{34m}Cl$, $^{45}Ti$, $^{48}V$, $^{60}Cu$, $^{61}Cu$, $^{64}Cu$, $^{66}Ga$, $^{76}Br$, $^{89}Zr$, $^{94m}Tc$ and $^{124}I$ and so on. Among the position emitting nuclide, in terms of appropriate length of a half life, and easiness of labeling, $^{11}C$, $^{13}N$, $^{15}O$, and $^{18}F$ are preferred, $^{18}F$ and $^{11}C$ are more preferred, and $^{18}F$ is particularly preferred. A labeling position of the compound of the present invention in the radioactive nuclide, for example, positron emitting nuclide, and a γ rays emitting nuclide may be any position, and preferred labeling position is on alkyl group/quinoline ring (including a phenyl ring) in the compound. Such a labeled compound of the present invention can also encompassed by the present invention. For example, when the compound of the present invention is labeled with $^{18}F$, either group on side chain may be labeled with $^{18}F$, or a hydrogen atom on the ring may be labeled with $^{18}F$. Also when the compound of the present invention is labeled with $^{11}C$, carbon atom contained in either of alkyl substituent in side chain may be replaced with $^{11}C$. Though it is obvious to a person skilled in the art, "m" in $^{99m}Tc$ indicates n nuclear isomer in a metastable state.

A radioactive nuclide to be used in the present invention is produced by an equipment that is called cyclotron or generator. A person skilled in the art can select a production method or an equipment depending of the nuclide produced. The compound of the present invention can be labeled with the nuclide produced in such a manner.

Methods of producing labeled compounds, which have been labeled with these radionuclides, are well known in the art. Typical methods include chemical synthesis, isotope exchange, and biosynthesis processes. Chemical synthesis processes have been traditionally and widely employed, and are essentially the same as usual chemical synthesis processes, except that radioactive starting materials are used. Various nuclides are introduced into compounds by these chemical processes.

Isotope exchanging processes are processes by which $^3H$, $^{35}S$, $^{125}I$ or the like contained in a compound of a simple structure is transferred into compound having a complex structure, thereby obtaining a compound having a complex structure that has been labeled with these nuclide. Biosynthesis processes are processes by which a compound labeled with $^{14}C$, $^{35}S$ or the like is given to cells such as microorganisms to obtain its metabolites having these nuclide introduced therein. In the case of $^{18}F$, a chemical form as fluorine anion, which can be prepared in large amount thereof by cyclotron with high specific radioactivity, is often used in a labeling synthesis, and a salt of $^{18}F$ anion with increased nucleophilicity is used as a labeling agent in a nucleophilic substitution with a compound having a leaving group (label precursor) to give the $^{18}F$ labeled compound of the present invention. The nucleophilic substitution is preferably carried out in an organic solvent, and is more preferably reacted in anhydrous high polar solvent (such as DMSO, acetonitrile, and DMF). The reaction temperature is not particularly limited, and may either be at room temperature or with heating, for example, a temperature near the boiling point of the used reaction solvent. The reaction period may be within a range of a few minutes to a few days, and the reaction may be achieved, for example, within a range of a few minutes to a few hours. The step comprising introduction of the radionuclide should be as close as possible to the end of the radiosynthesis.

After the nucleophilic substitution, the protecting group for hydroxy group in the obtained product may be removed under acidic or alkali condition to obtain the desired $^{18}F^-$ labeled compound.

Also, the solution comprising the $^{18}F^-$ labeled compound of the present invention may be contacted with an ion-exchange resin supported by $^{18}F^-$ to obtain $^{18}F^-$ labeled compound of the present invention.

With respect to the labeling position, similarly to a usual synthesis, synthetic schemes can be designed depending upon the purpose, so that a label can be introduced at a desired position. Such design is well known to a person with ordinary skill in the art.

When utilizing positron emitting nuclides such as $^{11}C$, $^{13}N$, $^{15}O$ and $^{18}F$, which have relatively short half-lives, for example, it is also possible to generate a desired nuclide from a (highly) small-sized cyclotron placed in a facility such as hospital, which in turn is used to label a desired compound at its desired position by any of the above-described methods, followed by carrying out immediately diagnosis, examination, treatment or the like.

These methods well known to a person with ordinary skill in art enable one to carry out labeling by introducing a desired nuclide into the compound of the present invention at its desired position.

According to one embodiment of the present invention, specific examples of the labeled compounds include compounds selected from the group consisting of the following compounds:

THK-5470

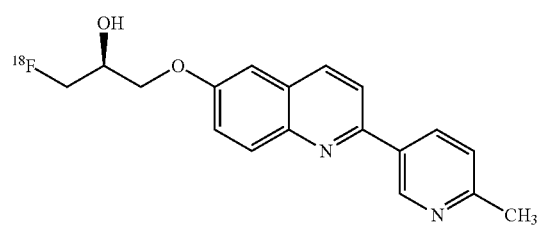

THK-5471

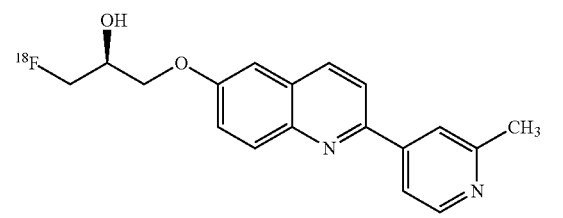

THK-5472

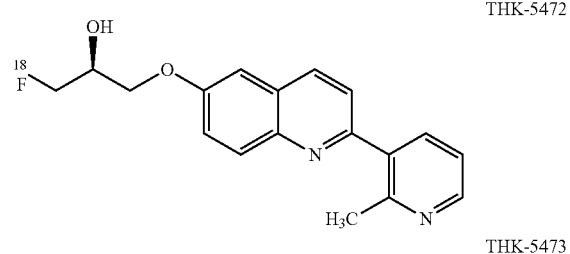

THK-5473

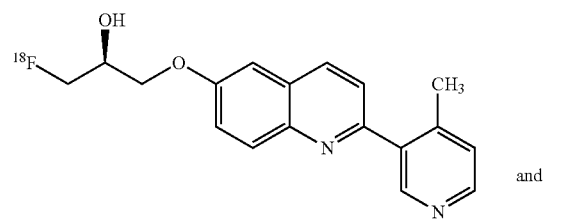

and

THK-5474

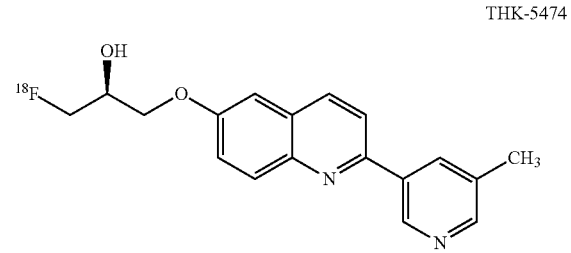

or a pharmaceutically acceptable salt or solvate thereof.

The labeled compound of the present invention may be administered to subjects locally or systemically. Routes for administration include intradermal, intraperitoneal, intravenous, intra-arterial injections or infusions into the spinal fluid and the like, and can be selected depending on factors such as the disease type, nuclide used, compound used, the condition of the subject, the site to be examined. The site to be examined can be investigated with means such as PET, SPECT by administering the probe of the present invention, followed by the elapse of a sufficient time to allow its binding to MAO-B and decay. These procedures can be selected as appropriate depending on factors such as the disease type, nuclide used, compound used, the condition of the subject, the site to be examined.

The dose of the compound of the present invention, which has been labeled with a radionuclide, varies depending on the disease type, nuclide used, compound used, the age, physical condition, and gender of the subject, the degree of the disease, the site to be examined and the like. In particular, sufficient care has to be taken in connection with radioactive exposure to the subject. For example, the amount of radioactivity of the compound labeled with a positron emitting nuclide such as $^{11}c$, $^{13}N$, $^{15}O$ and $^{18}F$ of the present invention, is usually within a range from 3.7 megabecquerels to 3.7 gigabecquerels, and preferably from 18 megabecquerels to 740 megabecquerels.

The compound of the present invention or a salt or solvate thereof is suited for use in a diagnosis method of neurological diseases related to MAO-B, a composition for diagnosis, a kit for diagnosis, a use for preparing these compositions or kit, as well as other uses, which is described below. Since the compound of the present invention has a property of excellent brain delivery, and at the same time, also has another property of disappearing (that is, washing out) rapidly any substances that aren't binded to MAO-B from the brain, positron emitting nuclides, preferably the compounds labeled with $^{18}$F are suitable for a probe that can image MAO-B in a brain with high sensitivity by using PET. Also since the compound has low or low or non-recognized bone-seeking properties, the compound is suitable for an administration to human body.

The present invention provides a composition containing the compound of the present invention for diagnostic imaging of MAO-B related-neurological diseases. The composition of the present invention contains the compound of the present invention and a pharmaceutically acceptable carrier. It is preferred that the compound of the present invention in the composition is labeled. Although various labeling methods are possible as described above, labeling with radionuclides (in particular, positron emitting nuclides such as $^{11}$C, $^{13}$N, $^{15}$O and $^{18}$F for PET) is desirable for in vivo image diagnosis applications. It is preferable from their purposes that the form of the composition of the present invention is one allowing injection or infusion. Accordingly, a pharmaceutically acceptable carrier is preferably liquid and examples thereof include, but are not limited to, aqueous solvents such as potassium phosphate buffer, physiological saline, ringer solution and distilled water; and non-aqueous solvents such as polyethylene glycol, vegetable oil, ethanol, glycerin, dimethyl sulfoxide and propylene glycol. A mixing ratio of the carrier to the compound of the present invention can be appropriately selected depending on the site of application, detection means and the like, and is usually from 100,000:1 to 2:1, and preferably from 10,000:1 to 10:1. The composition of the present invention may further contain known antimicrobials (for example, antimicrobial drug, etc.), local anesthetics (for example, procaine hydrochloride, etc.), buffers (for example, Tris-hydrochloride buffer, HEPES buffer, etc.), osmolytes (for example, glucose, sorbitol, sodium chloride, etc.) and the like.

Furthermore, the present invention provides a kit for image diagnosis of MAO-B related-neurological diseases, containing the compound of the present invention as the essential ingredient. Usually, the kit is a package in which each of the components such as the labeled compound of the present invention, or its labeled precursor, a solvent for dissolving the compound, a reagent used for labeling synthesis or a solution of the same, a buffer, an osmoregulatory agent, an antimicrobial, a local anesthetic, a solubilizing agent, a radiolysis-preventing agent are packaged separately into respective containers, or some of the components are packaged together into respective containers. The compound of the present invention may be unlabeled or labeled. When not labeled, a kit may contain a labeled precursor of the present invention, and the labeled compound of the present invention can be prepared using the labeled precursor by a labeling synthesis, prior to use, according to usual methods as described above. In addition, the compound of the present invention may be presented as a solid, such as a lyophilized powder, or in solution in appropriate solvents. Solvents may be similar to carriers used in the above composition of the present invention. Each of the components such as a buffer, an osmoregulatory agent, an antimicrobial, a local anesthetic, also may be similar to those used in the above composition of the present invention. While various containers can be selected as appropriate, they may be of shapes suitable for carrying out the introduction of a label into the compound of the present invention, or of light-shielding materials, depending on the nature of compounds, or take forms such as vials or syringes, so as to be convenient for administration to patients. The kit may also contain, as appropriate, container or instruments for labeling synthesis, such as vials, syringe, three-way stopcock, needle, solid-phase extraction cartridge, sterilizing filter and the others. The kit may further contain, as appropriate, tools necessary for diagnosis, for example, syringes, an infusion set, or device for use in a PET or SPECT apparatus. The kit usually has its instructions attached thereto.

Furthermore, the compounds of the present invention specifically bind to MAO-B, and thus can be also used, for example, for detecting and quantifying tau protein with or without labeling by contacting with sample specimens in vitro. For example, the compounds of the present invention can be used for staining MAO-B in microscopic specimens, for colorimetric determination of MAO-B in samples, or for quantifying MAO-B using a scintillation counter. Preparation of a microscope specimen and staining using the compound of the present invention can be carried out by a conventional method known to a person with an ordinary skill in the art.

As described above, the compounds of the present invention are highly specific to MAO-B. Therefore, the compounds of the present invention are useful, for example, for studies of diseases associated with MAO-B accumulation or in their diagnosis before and after death, and could be useful, for example, as agents for staining MAO-B of MAO-B-related neurological diseases (for example, Alzheimer's disease) patients. Staining of specimens, for example, brain sections using the compounds of the present invention can be carried out in a conventional method known to a person of ordinary skill in the art.

The present invention is directed to a composition for staining of MAO-B, containing the compound of the present invention or a pharmaceutically acceptable salt or solvate thereof, and a kit for staining of MAO-B in a sample containing the compound of the present invention or a pharmaceutically acceptable salt or solvate thereof as essential ingredients. Furthermore, the present invention is directed to a method of staining MAO-B in a sample, the method comprising using the compound of the present invention or a pharmaceutically acceptable salt or solvate thereof. Samples suited for above staining are brain sections.

Forms of such compositions (including pharmaceutical compositions) are not limited particular, but liquid formulations, particularly formulations for injection, are preferable. Such formulations for injection can be infused directly into the brain, or alternatively the above pharmaceutical compositions can be formulated for intravenous injection or drip and administered, since the compounds of the present invention have high permeability through the blood-brain barrier, as shown in the Examples. Such liquid formulations can be prepared by methods well known in the art. Solutions can be prepared, for example, by dissolving the compound of the present invention in an appropriate carrier, water for injection, physiological saline, Ringer's solution or the like, sterilizing the solution through a filter or the like, and then filling the sterilized solution into appropriate containers, for example, vials or ampules. Solutions also can be lyophilized and when used, reconstituted with an appropriate carrier. Suspensions can be prepared, for example, by sterilizing the compound of the present invention, for example, by exposure to ethylene oxide, and then suspending it in a sterilized liquid carrier.

When such a pharmaceutical composition is used in a liquid formulation, particularly a formulation for injection, an injection can be prepared by adding a solubilizing agent to a quinoline derivative according to the present invention.

It is possible to use, as the solubilizing agent, nonionic surfactants, cationic surfactants, amphoteric surfactants and the like used in the art. Among these solubilizing agents, an agent in which the radioactive nuclide has such chemical form as being suitable for labeling the compound, and is known to those skilled in the art.

(Process of the Compound of the Present Invention)

Next, aprocesses of the compound of the present invention are explained below, but isn't limited to these processes.

Process 1

By going through the compound represented by the below-mentioned formula (IV) or (V) as an intermediate compound, the compound of the present invention (that is, the compound represented by formula (I')) can be obtained.

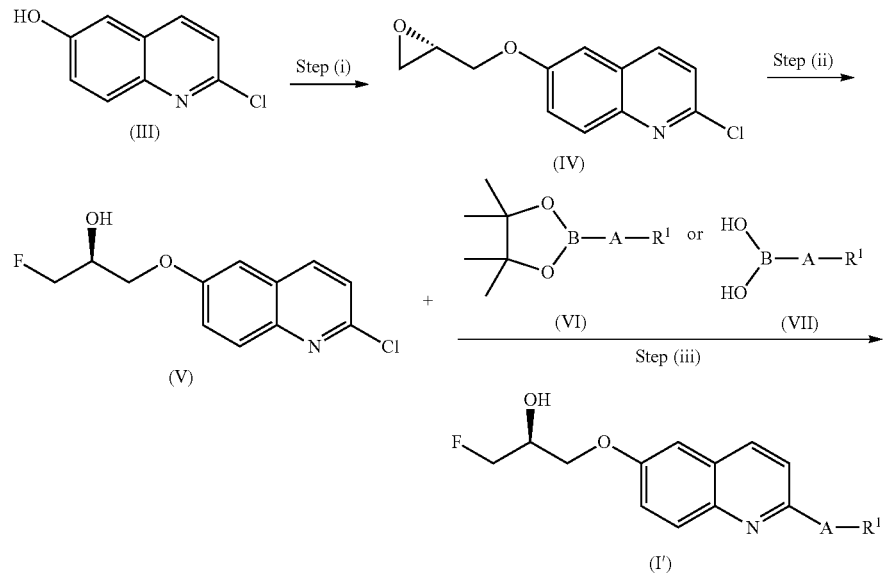

Polysorbate 80, polyethylene glycol, ethanol or propylene glycol is preferable, and Polysorbate 80 is more preferable.

The amount of the compounds of the present invention to be administered to a human subject in the above treatment method, prevention method and use varies depending on the condition, gender, age, weight of the patient and the like, and is generally within a range from 0.1 mg to 1 g, preferably from 1 mg to 100 mg, and more preferably from 5 mg to 50 mg, per day for adult humans weighing 70 kg. It is possible to conduct a treatment with such a dose for a specified period of time, followed by increasing or reducing the dose according to the outcome.

Furthermore, the compound of the present invention or a pharmaceutically acceptable salt or solvate thereof can also be used as a probe for the diagnosis of MAO-B-related neurological diseases, preferably an image diagnosis probe labeled with a radiation nuclide.

Further, the present invention provides a kit for preparing a compound of the present invention or a pharmaceutically acceptable salt or solvate thereof, the kit comprising a compound of the present invention or a pharmaceutically acceptable salt or solvate thereof, a labeling agent, and optionally instructions for labeling the compound. The labeling agent is, for example, a radioactive nuclide or a positron emitting nuclide. The radioactive nuclide is, for example, a γ-ray emitting nuclide. The positron emitting nuclide is selected from, for example, the group consisting of $^{11}C$, $^{13}N$, $^{15}O$, $^{18}F$, $^{35m}Cl$, $^{76}Br$, $^{45}Ti$, $^{48}V$, $^{60}Cu$, $^{61}Cu$, $^{62}Cu$, $^{64}Cu$, $^{66}Ga$, $^{89}Zr$, $^{94m}Tc$, and $^{124}I$. Preferably, the positron emitting nuclide is $^{11}C$ or $^{18}F$. The labeling agent is Step (i)

The compound represented by formula (III) can be obtained by subjecting to a Mitsunobu reaction using (R)-(+)-glycidol in the presence of triphenylphosphine and azide reagent to obtain a compound represented by formula (V).

The reaction is usually carried out in the presence of a solvent. The solvents to be used in the reaction may be any solvents as long as they don't affect the reaction, and examples of the solvent include halogenated hydrocarbons (such as dichloromethane), ethers (such as THE), aromatic hydrocarbons (such as toluene), water, and mixed solvents of two or more kinds of these solvents.

Though the reaction condition isn't particularly limited as long as it is the reaction condition for Mitsunobu reaction, for example, the reaction can be carried out by using azide reagent (for example, diphenylphosphoryl azide (DPPA) is used in the presence of azodicarboxylic acid diester (such as diethyl azodicarboxylate (DEAD), diisopropyl azodicarboxylate (DIPD), and triphenylphosphine ($Ph_3P$)).

In the reaction, (R)-(+)-glycidol is used within a range of usually 1 mole to excess molar amounts, such as 1 mole to 1.5 moles, relative to 1 mole of the compound represented by formula (III).

The reaction temperature in the reaction is within a range of usually-78 to 100° C., preferably 0 to 50° C.

The reaction period in the reaction is within a range of usually 0.1 hours to several days, for example, within a range of 1 to 24 hour(s).

When the reaction is completed, the reaction mixtures can be worked up (for example, chromatography purification, or recrystallization) to isolate the compound represented by formula (IV).

Step (ii)

The compound represented by formula (iv) can be reacted with a fluorination reagent and a reduction reagent to obtain the compound represented by formula (V).

The reaction is usually carried out in a solvent. The solvents to be used in the reaction may be any solvents as long as they don't affect the reaction, and examples of the solvents include ethers (such as THE), aromatic hydrocarbons (such as chlorobenzene), or mixed solvents of two or more kinds of these solvents.

Examples of a combination of the fluorination reagents and the reduction reagents include a combination of $KHF_2$ and $Bu_4N \cdot H_2F_3^-$.

In the reaction, a combination of $KHF_2$ and $Bu_4N \cdot H_2F_3^-$ is used within a range of 1 mole to 5 moles, for example, 1.5 moles to 3 moles, relative to 1 mole of the compound represented by formula (V).

The reaction temperature in the reaction is within a range of usually-78° C. to the reflux temperature of the reaction solvent (for example, 120° C.), preferably within a range of room temperature to 120° C. The reaction period in the reaction is within a range of usually 0.1 to 24 hour(s), for example, within a range of 1 to 12 hour(s).

When the reaction is completed, the reaction mixtures can be worked up (for example, chromatography purification, or recrystallization) to isolate the compound represented by formula (V).

Step (iii)

The compound represented by formula (V) can be subjected to Suzuki coupling reaction using a boron reagent represented by formula (VI) or formula (VII) in the presence of a palladium catalyst and a base to obtain the compound represented by formula (I').

The reaction is usually carried out in the presence of a solvent. The solvent to be used in the reaction may be any solvents as long as they don't affect the reaction, and examples of the solvents include halogenated hydrocarbons (such as 1,2-dimethoxyethane), ethers (such as THF), aromatic hydrocarbons (such as toluene), aliphatic hydrocarbons (such as hexane), or mixed solvents of two or more kinds of these solvents.

Examples of the boron reagents represented by formula (VI) or formula (VII) include the compounds wherein A and $R^1$ are the same as defined in the above-mentioned formula (I), and include, for example, the compounds represented by the following formulae:

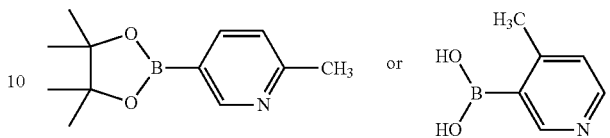

Though the reaction condition isn't particularly limited as long as it is the reaction condition for Suzuki coupling reaction, for example, the reaction can be carried out in the presence of a palladium catalyst (such as bis(triphenylphosphine) (II) dichloride) and a base (such as sodium carbonate).

In the reaction, the compound represented by formula (VI) or formula (VII) is used within a range of usually 1 mole to excess molar amounts, for example, within a range of 1 mole to 1.5 moles, and the palldium catalyst is used as a catalystic amount (for example, 10-1 to 10-3 moles), and the base is used within a range of 1 mole to 5 moles, for example, 1.5 moles to 3 moles, relative to 1 mole of the compound represented by formula (V).

The reaction temperature in the reaction is within a range of room temerature to to the reflux temperature of the reaction solvent (for example, 90° C.), preferably within a range of room temperature to 100° C. The reaction period in the reaction is within a range of usually 0.1 to 24 hour(s), for example, within a range of 1 to 12 hour(s).

When the reaction is completed, the reaction mixtures can be worked up (for example, chromatography purification, or recrystallization) to isolate the compound represented by formula (II').

Process 2

As alternative process, by going through the compound represented by the following formula (II), the compound of the present invention (the compound represented by formula (I')) can be also obtained.

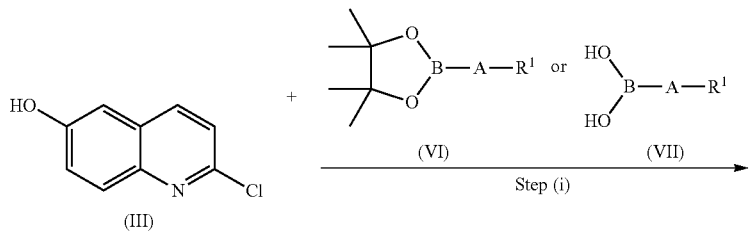

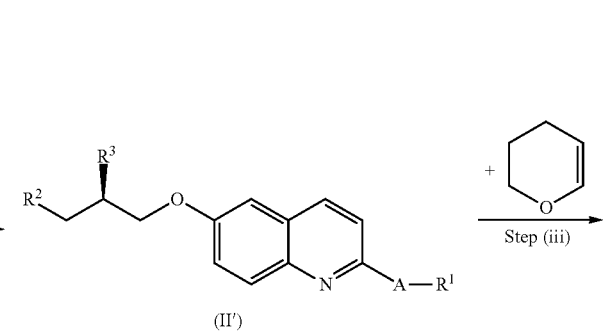

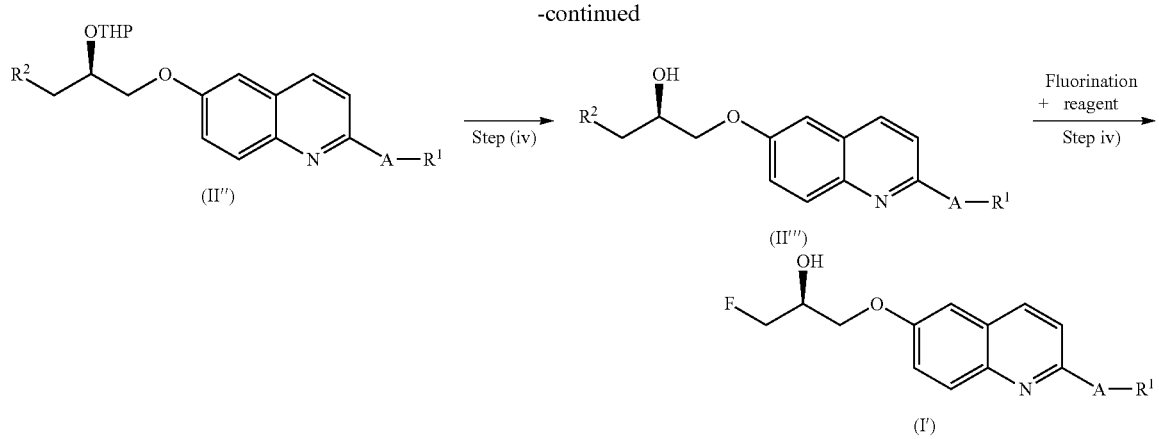

Step (i)

The compound represented by formula (III) can be subjected to a Suzuki copluing reaction using a boron reagent represented by formula (VI) or (VII) in the presence of a palladium catalyst and a base to obtain the compound represented by formula (VIII).

The reaction is usually carried in the presence of a solvent. The solvents to be used in the reaction may be any solvents as long as they don't affect the reaction, and examples of the solvents include halogenated hydrocarbons (such as 1,2-dimethoxyethane), ethers (such as THE), aromatic hydrocarbons (such as toluene), aliphatic hydrocarbons (such as hexane), or mixed solvents of two or more kinds of these solvents.

Examples of the boron reagent represented by formula (VI) or formula (VII) include any compounds wherein A and $R^1$ are the same as defined in the above-mentioned formula (I), and include, for example, the compounds represented by the following formula:

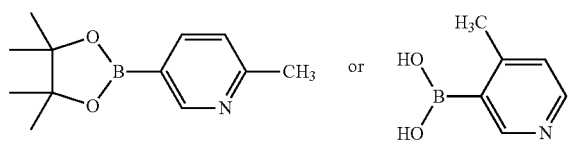

Though the reaction condition isn't particularly limited as long as it is the reaction condition for Suzuki coupling reaction, for example, the reaction can be carried out in the presence of catalyst as a palladium (such bis(triphenylphosphine) (II) dichloride) and a base (such as sodium carbonate).

In the reaction, the compound represented by formula (VI) or formula (VII) is used within a range of usually 1 mole to excess molar amounts, for example, within a range of 1 mole to 1.5 moles, and the palldium catalyst is used as a catalystic amount (for example, 10-1 to 10-3 moles), and the base is used within a range of 1 mole to 5 moles, for example, 1.5 moles to 3 moles, relative to 1 mole of the compound represented by formula (III).

The reaction temperature in the reaction is within a range of room temperature to the reflux temperature of the reaction solvent (for example, 90° C.), preferably within a range of room temperature to 100° C. The reaction period in the reaction is within a range of usually 0.1 to 24 hour(s), for example, within a range of 1 to 12 hour(s).

When the reaction is completed, the reaction mixtures can be worked up (for example, chromatography purification, or recrystallization) to isolate the compound represented by formula (VIII).

Step (ii)

The compound represented by formula (VIII) can be subjected to the Mitsunobu reaction using the compound represented by formula (ix) in the presence of triphenylphosphine and azide reagent to obtain the compound represented by formula (II').

The reaction is usually carried out in a solvent. The solvents to be used in the reaction may be any solvents as long as they don't affect the reaction, and examples of the solvents include halogenated hydrocarbons (such as dichloroethane), ethers (such as THF), aromatic hydrocarbons (such as toluene), water, or mixed solvents of two or more kinds of these solvents.

Though the reaction condition isn't particularly limited as long as it is the reaction condition for Mitsunobu reaction, for example, the reaction can be carried out by using azide reagent (for example, diphenylphosphoryl azide (DPPA) is used in the presence of azodicarboxylic acid diester (such as diethyl azodicarboxylate (DEAD), diisopropyl azodicarboxylate (DIPD), and triphenylphosphine ($Ph_3P$)).

In the reaction, the compound represented by formula (ix) is used within a range of usually 1 mole to excess molar amounts, such as 1 mole to 1.5 moles, relative to 1 mole of the compound represented by formula (III).

The reaction temperature in the reaction is within a range of usually-78 to 100° C., preferably 0 to 50° C.

The reaction period in the reaction is within a range of usually 0.1 hours to several days, for example, within a range of 1 to 24 hour(s).

When the reaction is completed, the reaction mixtures can be worked up (for example, chromatography purification, or recrystallization) to isolate the compound represented by formula (II').

The compound represented by formula (II') can be reacted with 3,4-dihydro-2H-pyrane to obtain the compound represented by formula (II') wherein $R^3$ is changed into OTHP group.

The reaction is usually carried out in the presence of a solvent. The solvents to be used in the reaction may be any solvents as long as they don't affect the reaction, and examples of the solvents include halogenated hydrocarbons (such as chloroform), ethers (such as THE), aromatic hydrocarbons (such as toluene), water, or mixed solvents of two or more kinds of these solvents.

The reaction may be carried out in the presence of an acid (such as trifluoroacetic acid).

3,4-Dihdro-2H-pyrane is used within a range of 1 mole to 100 moles, for example, 5 moles to 20 moles, relative to 1 mole of the compound represented by formula (II').

The reaction temperature in the reaction is within a range of usually-78 to 100° C., preferably 0 to room temperature. The reaction period in the reaction is within a range of usually 1 hour to several days, for example, within a range of 1 to 24 hours.

When the reaction is completed, the reaction mixtures can be worked up (for example, chromatography purification, or recrystallization) to isolate the compound represented by formula (II').

Step (iv)

The compound represented by formula (II'') can be reacted with water in the presence of an acid to obtain the compound represented by formula (II''').

The reaction is usually carried out in the presence of a solvent. The solvents to be used in the reaction may be any solvents as long as they don't affect the reaction and are miscible with water, and examples of the solvents include ethers (such as THF), ketones (such as acetone), or mixed solvents of two or more kinds of these solvents.

Examples of the acid include trifluoroacetic acid and paratoluenesulfonic acid, and the others.

In the reaction, a large excess amount of water is used relative to 1 mole of the compound represented by formula (II'').

In the reaction, the acid is used within a range of a catalytic amount to excess molar amounts, for example, within a range of 10-1 to 102 moles, relative to 1 mole of the compound represented by formula (II'').

The reaction temperature in the reaction is within a range of room temperature to 100° C., preferably room temperature to 80° C. The reaction period in the reaction is within a range of usually 1 hour to 24 hours, for example, within a range of 1 to 12 hours.

When the reaction is completed, the reaction mixtures can be worked up (for example, chromatography purification, or recrystallization) to isolate the compound represented by formula (II''').

Step (v)

The compound represented by formula (II''') can be reacted with a fluorination reagent to obtain the compound represented by formula (I') wherein $R^2$ is converted into a fluorine atom.

The reaction is usually carried out in the presence of a solvent. The solvents to be used in the reaction may be any solvents as long as they don't affect the reaction and are miscible with water, and examples of the solvents include halogenated hydrocarbons (such as dichloroethane), ethers (such as diethyl ether), nitriles (such as acetonitrile), or mixed solvents of two or more kinds of these solvents.

Examples of the fluorination reagents include tetra-butyl ammonium fluoride (TBAF), hydrofluoric acid (HF), and cesium fluoride (CsF), and the others.

In the reaction, the fluorination reagent is usually used within a range of 1 to 10 mole(s), for example, within a range of 1 to 5 mole(s), relative to 1 mole of the compound represented by formula (II''').

The reaction temperature in the reaction is within a range of 0° C. to 100° C., preferably 0° C. to room temperature. The reaction period in the reaction is within a range of usually 1 hour to several days, for example, within a range of 1 to 24 hours.

When the reaction is completed, the reaction mixtures can be worked up (for example, chromatography purification, or recrystallization) to isolate the compound represented by formula (I').

EXAMPLES

Hereinafter, the present invention is explained in more detail by Preparation examples of the compound of the present invention, Preparation examples of the intermediate compound, and Tests examples, however, is not limited to only these examples.

Here all reagents were used without purification of the commercially available reagents. As a medium pressure preparative liquid chromatography device, an automatically set-medium pressure preparative liquid chromatograph system (AI-580S) (manufactured by Yamazen corporation), HiFlash, and Universal column. A mass spectrum was measured by JEOL JMS-DX3030 (manufactured by Japan Electron Optics laboratory Co., Ltd.) or MALDI LTQ XL (manufactured by Thermo Fisher Scientific K. K.) according to an EI method or a method, MALDI respectively. 1H-NMR was measured by JEOL ECA-600 (manufactured by Japan Electron Optics laboratory Co., Ltd.) or Bruker AVANCE600 (manufactured by Bruker Corporation), and all chemical shifts were indicated relative to tetramethyl silane (0 ppm) as an internal standard. [$^{18}$F] Fluoroethyl harmine, and [$^{18}$F] THK-5351 were prepared according to the process described in Blom E et al., Synthesis and In vitro evaluation of $^{18}$F-β-carboline alkaloids as PET ligands. Journal of Labelled Compounds and Radiopharmaceuticals. 2008, 51 27-282.

Preparation Examples of the compound of the present invention is described.

Preparation Example 1

Preparation of THK-5470

One process for preparing the compound THK-5470 is described.

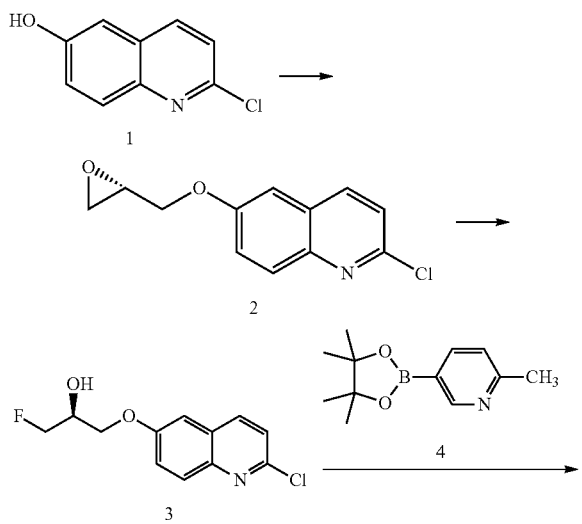

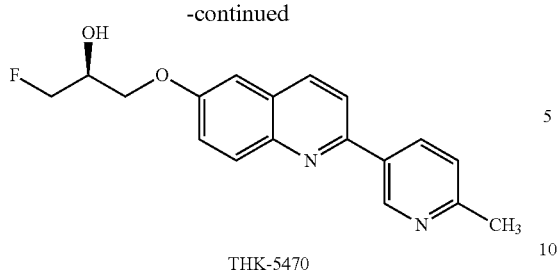

THK-5470

Step 1: Preparation of Compound 2

To a suspension of the compound 1 (500 mg, 2.78 mmol), (R)-(+)-glycidol (184 μL, 2.78 mmol), and triphenylphosphine (860 mg, 3.34 mmol) in dichloromethane (3 mL) was added dropwise a solution of diethyl azocarboxylate (1.5 mL, 3.34 mmol) in toluene over 10 minutes with stirring under ice-cooling, and the resulting mixture was stirred for 1 hour under ice-cooling and for 24 hours at room temperature. The reaction mixture was purified by a flash chromatography (silica gel, eluting solvent: ethyl acetate: n-hexane 16/64→37/53), and the solvent was evaporated under reduced pressure to obtain a compound 2 as white solid which was a crude product (457.7 mg).

Step 2: Preparation of Compound 3

A mixture of the compound 2 (436 mg), KHF2 (216 mg, 2.77 mmol), $Bu_4N·H_2F_3^-$ (1.85 mmol), and chlorobenzene (1 ml) was stirred at 120° C. for 7 hours. When the reaction was completed, an aqueous solution of potassium carbonate was added to the reaction mixture under ice-cooling to make it alkaline, and the reaction mixture was extracted with ethyl acetate. The organic layer was washed with water, dried over magnesium sulfate, and then filtered, and the filtrates was evaporated under reduced pressure, and the resulting residue was purified by flash chromatography (eluting solvent: ethyl acetate: n-hexane 27/73→48/52) to obtain a compound 3 as white solid (203 mg, 42.8% as a total of step 1 and step 2).

MALDI MS m/z=256 [M+H]$^+$

Step 3: Preparation of Compound THK-5470

To a solution of the compound 3 (202 mg, 0.79 mmol), and the compound 4 (208 mg, 0.95 mmol) in 1,2-dimethoxyethane (1.7 mL) were added sodium carbonate (251 mg, 2.37 mmol), water (0.75 mL) and bis(triphenylphosphine) palladium (II) dichloride (5.6 mg, 0.0008 mmol), and the reaction mixture was heated at 90° C. under reflux for 5 hours. The reaction mixture was allowed to cool to room temperature, and thereto was added water, and the mixture was extracted with ethyl acetate. The extracts were dried over magnesium sulfate, filtered, and the filtrates were evaporated under reduced pressure. The resulting residue was purified by flash chromatography (eluting solvent: ethyl acetate) to obtain the compound THK-5470 as a white solid (112 mg, 0.36 mmol).

$^1$H-NMR (600 MHZ, CDCl$_3$) δ 9.18 (s, 1H), 8.41-8.34 (m, 1H), 8.11 (d, J=8.9 Hz, 1H), 8.06 (d, J=8.9 Hz, 1H), 7.82 (d, J=8.2 Hz, 1H), 7.42-7.36 (m, 1H), 7.30 (d, J=7.5 Hz, 1H), 7.17-7.10 (m, 1H), 4.74-4.65 (m, 1H), 4.65-4.56 (m, 1H), 4.40-4.29 (m, 1H), 4.27-4.19 (m, 2H), 2.64 (s, 3H).

MALDI MS m/z=313 [M+H]$^+$

Preparation Example 2

Preparation of THK-5471

The process for preparing the compound THK-5471 is described.

THK-5471

Preparation of the Compound THK-5471

To a solution of the compound 3 (prepared according to the process described in Preparation example 1) (79.3 mg, 0.31 mmol) and the compound 5 (67.9 mg, 0.31 mmol) in 1,2-dimethoxyethane (1.7 mL) were added sodium carbonate (98.6 mg, 0.93 mmol), water (0.75 mL), bis(triphenylphosphine) palladium (II) dichloride (5.8 mg, 0.008 mmol), and the mixture was heated at 90° C. under reflux for 2 hours. The reaction mixture was allowed to cool to room temperature, and thereto was added water, and the mixture was extracted with ethyl acetate. The extracts were dried over magnesium sulfate, filtered, and the filtrates were evaporated under reduced pressure. The residue was purified by flash chromatography (eluting solvent: ethyl acetate) to obtain the compound THK-5471 as white solid (28.9 mg, 0.09 mmol, 29.8%).

$^1$H-NMR (600 MHZ, CDCl$_3$) δ 8.65 (d, J=5.2 Hz, 1H), 8.17 (d, J=8.5 Hz, 1H), 8.11 (d, J=9.2 Hz, 1H), 7.93 (s, 1H), 7.87 (d, J=8.5 Hz, 1H), 7.81-7.79 (m, 1H), 7.45-7.43 (m, 1H), 7.16 (d, J=2.7, 1H), 4.73-4.68 (m, 1H), 4.65-4.60 (m, 1H), 4.38-4.33 (m, 1H), 4.25-4.24 (m, 2H), 2.69 (s, 3H).

MALDI MS m/z=313 [M+H]$^+$

Preparation Example 3

Preparation of THK-5472

One process for preparing the compound THK-5472 is described.

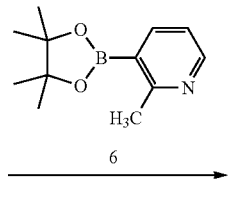

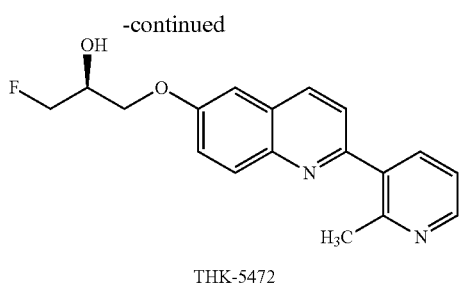

THK-5472

Preparation of the Compound THK-5472

To a solution of the compound 3 (prepared according to the process described in Preparation example 1) (143 mg, 0.56 mmol), the compound 6 (147 mg, 0.67 mmol) in 1,2-dimethoxyethane (1.7 mL) were added sodium carbonate (178 mg, 1.68 mmol), water (0.75 mL), and bis(triphenylphosphine) palladium (II) dichloride (5.8 mg, 0.008 mmol), and the mixture was heated at 90° C. under reflux for 12 hours. the reaction mixture was allowed to cool to room temperature, and thereto was added water, and the mixture was extracted with ethyl acetate. The extracts were dried over magnesium sulfate, filtered, and the filtrates were evaporated under reduced pressure. The residue was purified by flash chromatography (eluting solvent: ethyl acetate:methanol=100/0→90/10) to obtain the compound THK-5472 as white solid (37.3 mg, 0.12 mmol, 21.3%).

$^1$H-NMR (600 MHZ, DMSO-d$_6$) δ 8.54 (m, 1H), 8.37 (d, J=8.5 Hz, 1H), 7.97 (d, J=9.0 Hz, 1H), 7.90-7.89 (m, 1H), 7.72 (d, J=8.5 Hz, 1H), 7.49-7.46 (m, 2H), 7.39-7.37 (m, 1H), 5.5 (d, J=4.9 Hz, 1H), 4.62-4.57 (m, 1H), 4.54-4.49 (m, 1H), 4.18-4.11 (m, 3H), 2.57 (s, 3H).

MALDI MS m/z=313 [M+H]$^+$

Preparation Example 4

Preparation of the Compound THK-5473

The process for preparing the compound THK-5473 is described.

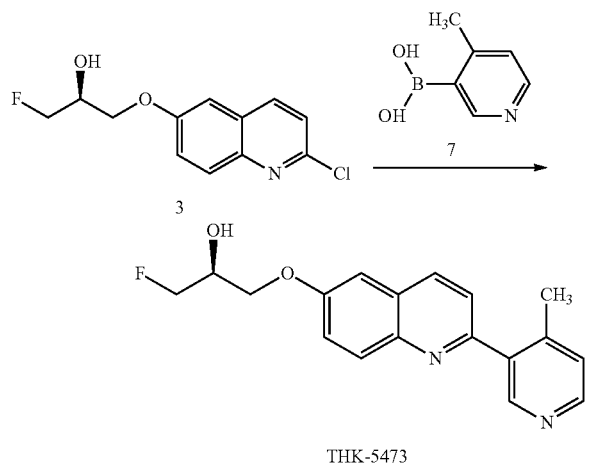

THK-5473

Preparation of the Compound THK-5473

To a solution of the compound 3 (prepared according to the process described in Preparation example 1) (156.5 mg, 0.60 mmol) and the compound 7 (98.6 mg, 0.7 mmol) in 1,2-dimethoxyethane (1.7 mL) were added sodium carbonate (190.7 mg, 1.8 mmol), water (0.75 ml), and bis(triphenylphosphine) palladium (II) dichloride (8.8. mg, 0.007 mmol), and the mixture was heated at 90° C. under reflux for 24 hours. The reaction mixture was allowed to cool to room temperature, and thereto was added water, and the mixture was extracted with ethyl acetate. The extracts were dried over magnesium sulfate, filtered, and the filtrates were evaporated under reduced pressure. The residue was purified by flash chromatography (eluting solvent: ethyl acetate:methanol=100/0→90/10) to obtain the compound THK-5473 as white solid (13.7 mg, 0.004 mmol, 7.3%).

$^1$H-NMR (600 MHZ, DMSO-d$_6$) δ 8.65 (s, 1H), 8.50 (d, J=5.0 Hz, 1H), 8.38 (d, J=8.5 Hz, 1H), 7.97 (d, J=9.1 Hz, 1H), 7.73 (d, J=8.5 Hz, 1H), 7.49-7.46 (m, 2H), 7.39 (d, J=5.0 Hz, 1H), 5.5 (d, J=4.9 Hz, 1H), 4.62-4.56 (m, 1H), 4.54-4.49 (m, 1H), 4.17-4.12 (m, 3H), 2.43 (s, 3H).

MALDI MS m/z=313 [M+H]$^+$

Preparation Example 5

Preparation of the Compound THK-5474

One process for preparing the compound THK-5474 is described.

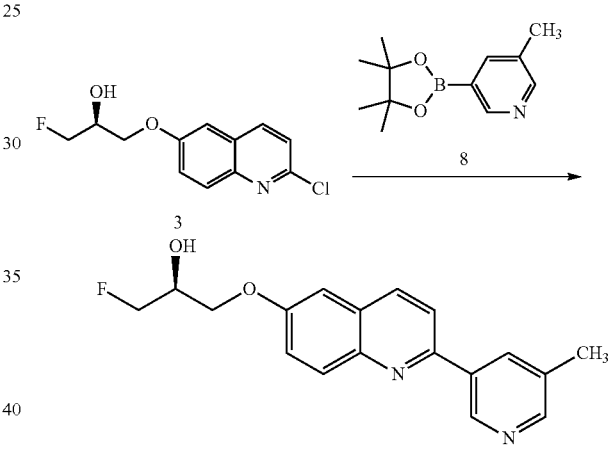

THK-5474

Preparation of the Compound THK-5474

To a solution of the compound 3 (prepared according to the process described in Preparation example 1) (159.7 mg, 0.62 mmol), and the compound 8 (163 mg, 0.74 mmol) in 1,2-dimethoxyethane (1.7 mL) were added sodium carbonate (178 mg, 1.68 mmol), water (0.75 ml), bis(triphenylphosphine) palladium (II) dichloride (4.3 mg, 0.006 mmol), and the mixture was heated at 90° C. under reflux for 2 hours. The reaction mixture was allowed to cool to room temperature, and thereto was added water, and the mixture was extracted with ethyl acetate. The extracts were dried over magnesium sulfate, filtered, and the filtrates were evaporated under reduced pressure. The residue was purified by flash chromatography (eluting solvent: ethyl acetate:methanol=100/0→90/10) to obtain the compound THK-5474 as white solid (7.7 mg, 0.025 mmol, 1.4%). 1H-NMR (600 MHz, CDCl$_3$) δ 9.10 (s, 1H), 8.52 (s, 1H), 8.32 (s, 1H), 8.15 (d, J=8.5 Hz, 1H), 8.09 (d, J=9.2 Hz, 1H), 7.85 (d, J=8.5 Hz, 1H), 7.43-7.41 (m, 1H), 7.15 (m, 1H), 4.73-4.68 (m, 1H), 4.65-4.60 (m, 1H), 4.37-4.34 (m, 1H), 4.26-4.22 (m, 1H), 2.47 (s, 3H).

MALDI MS m/z=313 [M+H]$^+$

Next, the preparation example of precursors for preparing the compound of the present invention is described.

Preparation Example 6

Preparation of the Compound THK-5475 (Precursor of THK-5470)

One process for preparing the compound THK-5475 is described.

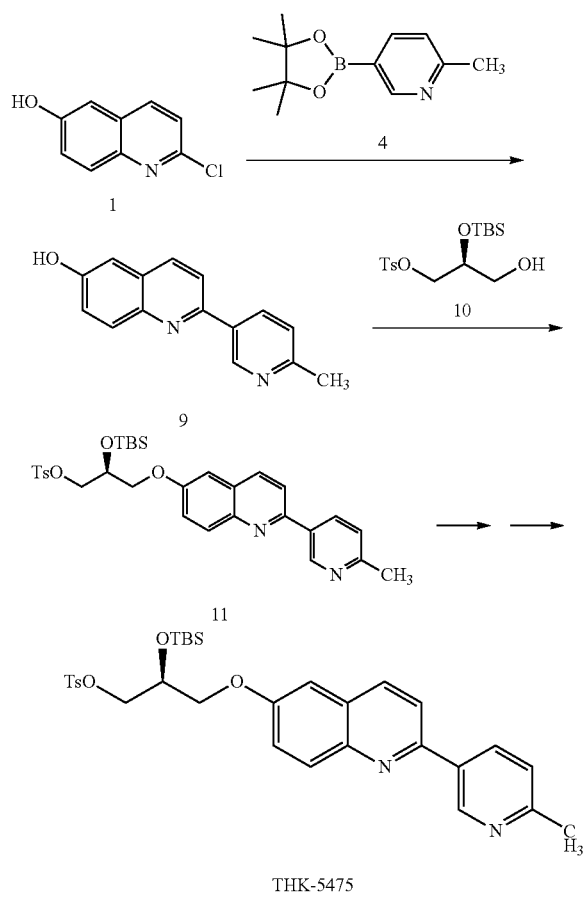

THK-5475

Step 1: Preparation of the Compound 9

The compound 1 (1.12 g, 6.24 mmol), the compound 4 (1.64 mg, 7.49 mmol), sodium carbonate (1.32 g, 12.5 mmol), and bis(triphenylphosphine) palladium (II) dichloride (42.5 mg, 0.006 mmol) were added to a mixed solution of water, ethanol, and 1,2-dimethoxyethane (20 mL), and the mixture was heated at 90° C. under reflux for 2 hours. The reaction mixture was allowed to cool to room temperature, and thereto was added water, and the mixture was extracted with ethyl acetate. The extracts were dried over magnesium sulfate, filtered, and the filtrates were evaporated under reduced pressure. The residue was purified by flash chromatography (eluting solvent: ethyl acetate/n-hexane=32/68→47/53) to obtain the compound 5 as white solid (1.09 g, 74%).

EI-MS m/z 236 [M]$^+$.

Step 2: Preparation of the Compound 11

To a suspension of the compound 9 (57 mg, 0.24 mmol), the compound 10 (86.5 mg, 0.24 mmol), and triphenylphosphine (75.5 mg, 0.29 mmol) in dichloromethane (3 mL) was added dropwise a solution of diethyl azocarboxylate (133 µL, 0.29 mmol) in toluene over 10 minutes with stirring under ice-cooling, and the mixture was stirred for 1 hour under ice-cooling, and for 24 hours at room temperature. The reaction solution was purified by flash chromatography (eluting solvent: ethyl acetate/methanol 100/0→93/7), and the solvents were evaporated under reduced pressure to obtain the compound 11 as white solid (108.8 mg, 0.18 mmol, 78%).

MALDI MS m/z=579 [M]$^+$.

Steps 3 and 4: Preparation of the Compound THK-5475

To the solution of the obtained compound 11 as white solid (108.8 mg, 0.18 mmol) in chloroform (1.5 ml) was added dropwise trifluoroacetic acid (1 mL) with stirring under ice-cooling, and thereto was added water (0.25 mL), and the mixture was stirred at room temperature for 24 hours. To the reaction mixture was added an appropriate amount of ice water, and the mixture was adjusted with an aqueous solution of potassium carbonate to pH 8, and the mixture was then extracted with ethyl acetate. The extracts were dried over magnesium sulfate and then purified by flash chromatography (eluting solvent: ethyl acetate). The resulting oils (58.4 mg) were solubilized in chloroform (3 mL), and to the mixture were added 3,4-dihydro-2H-pyrane (233 µL, 2.5 mmol), and paratoluene sulfonic acid monohydrate (43 mg, 0.25 mmol), and the mixture was stirred at room temperature for 10 minutes. The reaction mixture was adjusted with triethyl amine to pH 8, and the solvents were evaporated under reduced pressure. The residue was purified by flash chromatography (eluting solvent: ethyl acetate/n-hexane 89/11→100/0) to obtain the compound THK-5475 as white solid (22.6 mg, 0.04 mmol, 21% as total of the step 3 and the step 4).

$^1$H-NMR (597 MHZ, CDCl$_3$) δ 9.18 (d, J=13.7 Hz, 1H), 8.39 (t, J=8.5 Hz, 1H), 8.10 (d, J=8.2 Hz, 1H), 8.00-8.04 (m, 1H), 7.85-7.64 (m, 4H), 7.58-7.50 (m, 1H), 7.49-7.44 (m, 2H), 7.33-7.27 (m, 3H), 5.51-5.17 (m, 1H), 4.42-4.17 (m, 2H), 4.17-4.05 (m, 4H), 2.64 (d, J=6.8 Hz, 3H), 2.38 (s, 2H), 2.04 (s, 3H), 1.26 (t, J=7.2 Hz, 6H), 0.88 (t, J=6.8 Hz, 1H).

MALDI MS m/z=549 [M+H]$^+$.

Also, the preparation examples of the labeled compound of the compound of the present invention is described.

Preparation Example 7

Preparation of Labeled Compound [$^{18}$F] THK-5470

$^{18}$F$^-$ was synthesized by irradiating [$^{18}$O] H$_2$O having isotope purity of 98% or more with 12 MeV of proton beam accelerated by Cyclotron HM12 (manufactured by Sumitomo Heavy Industries, Ltd.). Subsequently, the solution thereof was passed through an anion-exchange resin (AG1-X8) thereby trapping $^{18}$F$^-$ on the resin, followed by elution with a 33 mM K$_2$CO$_3$ solution. After transferring this aqueous $^{18}$F$^-$-containing K$_2$CO$_3$ solution (200 µL, 3.2 GBq) in a brown vial, Kryptofix 222 (16 mg) and acetonitrile (2.3 mL) were added and a He gas was sprayed while heating in an oil bath (110° C.), and then acetonitrile was completely removed while azeotropically distilling water. The THK-5475 3 mg was solubilized in DMSO solution (0.70 mL), and the mixture was added to a reaction vial, and was reacted at 110° C. for 10 minutes. Thereafter, to the reaction solution was added hydrochloric acid (2M, 0.5 mL), and the mixture was reacted at 110° C. for another 5 minutes, and the reaction solution was diluted with potassium acetate solution (4M, 0.25 mL) and distilled water (7.0 mL), and loaded into a Sep-Pak tC18 cartridge (manufactured by Waters), and after washing the cartridge with distilled water (5.0 mL), the crude product was eluted with acetonitrile. A fraction showing highest radioactivity was diluted with distilled water, and high-performance liquid subjected to semi-preparative chromatography (column: Inertsil ODS-4) (10× 250 mm), mobile phase: MeCN/NaH$_2$PO$_4$ (20 mM)=35/65, flow rate: 5.0 mL/min, wave length: 340 nm) to purify it. Radioactive peaks were recovered, and diluted with distilled water 15 mL, and passed through a Sep-Pak tC18 cartridge. The peaks solutions were washed with distilled water 10 mL, and eluated with ethanol 1.5 mL. This solution was used in In vitro autoradiograpghy experiment. In an internal distribution experiment method, polysorbate 80 was added to ethanol solution, and after etanol was evaporated with an evaporator, the radioactive residue in the same flask containing [$^{18}$F] THK-5470 was solublized in saline to make an injectable solution. Similarly, for [$^{18}$F] THK-5351, a radiation synthesis was conducted according to a method described in the literature (Harada R et al., 18 FTHK-5351: A Novel PET Radiotracer for Imaging Neurofibrillary Pathology in Alzheimer Disease. Journal of Nuclear Medicine. 2016, 57 (2): 208-214).

Further, the test example of the compound of the present invention is described.

Test Example 1

Binding affinity against monoamine oxidase-B (MAO-B) and monoamine oxidase A (MAO-A)

MAO-B (M7441) was purchased from Sigma Aldrich Co. LLC (St. Louis, MO). The MAO-B membrane fractions (0.5 μg), and 0.1 to 10,000 nM of [3H] THK-5351 (1 μM) were mixed (200 μL), and the mixture was reacted at room temperature for 2 hours. The reaction solution was transferred to MultiScreen HTS 96-well 0.65 μL filtration plate (Millipore, Billerica, MA), and a B/F separation was conducted with a MultiScreen HTS Vacuum Manifold, and the mixture was washed with Dulbecco's PBS, and 0.1% BSA three times, and the filter was incubated with 2 mL of Scintillation fluid (Emulssifer-Safe; Perkin Elemer, Boston, MA), and a radio activity was measured with a beta counter (LS6500 liquid scintillation counter, Beckman Counter, Brea, CA). IC$_{50}$ value was calculated by using Graph Pad Prism Version 7 (GraphPad Software, San Diego, CA).

MAO-A (M7316) was purchased from Sigma Aldrich Co. LLC (St. Louis, MO). The MAO-Bmembrane fraction (0.5 μg) and 0.1 to 10,000 nM of [$^{18}$F] Fluoroethyl harmine (10 μCi/mL, 2 nM) as non-label test compound were mixed (200 μL), and the mixture was reacted at room temperature for 1 hour. The reaction solution was transfered to MultiScreen HTS 96-well 0.65 μm filtration plate (Millipore, Billerica, MA), and a B/F separation was conducted with MultiScreen HTS Vacuum Manifold, and washed with Dulbecco's PBS and 0.1% BSA three times, and a radioactivity contained in a filter was measured with a gamma counter (AccFLEX γ7000, manufactured from ALOKA Co. Ltd.). The IC$_{50}$ value was calculated similarly to the case of MAO-B.

A binding affinity against tau continined in a AD brain was conducted by using Alzheimer's disease brain (Braak stage VI) and [3H] MK-6240 (manufactured by Metck & Co) as a label ligand. The IC$_{50}$ value was calculated similarly to the case of MAO-B.

(Results)

The tests of competitive binding tests against MAO-B, MAO-A, and tau are shown in the Table 1 below. The THK-5351 as a control compound indicated a high binding to MAO-B, and also a mild binding to tau. Any of the compounds of the present invention, THK-5471, THK-5472, THK-5473, and THK-5474 showed low binding against MAO-A and tau. Whereas, these compounds of the present invention showed high binding to MAO-B, for example, every of the compound THK-5470, the compound THK-5471, and the compound THK-5474 showed significantly high binding to MAO-B. In particular, the compound of the present invention, that is, THK-5470 showed remarkably high binding affinity of IC$_{50}$=4.2 nM against MAO-B, whereas low binding affinity of IC$_{50}$=4462 nM against tau, which thus means that the binding selectivity ratio of MAO-B/tau was 1,000 bolds or more.

TABLE 1

| Entry | Chemical structure | MAO-B (IC$_{50}$, nM) | MAO-A (IC$_{50}$, nM) | Tau (IC$_{50}$, nM) |
|---|---|---|---|---|
| THK-5470 | 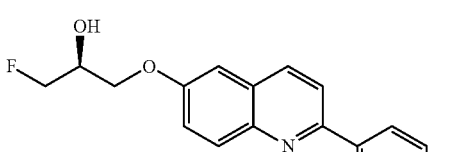 | 4.2 | 713 | 4,462 |
| THK-5471 | 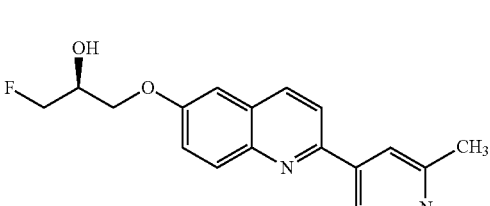 | 12.9 | 1,745 | 191.5 |

TABLE 1-continued

| Entry | Chemical structure | MAO-B (IC$_{50}$, nM) | MAO-A (IC$_{50}$, nM) | Tau (IC$_{50}$, nM) |
|---|---|---|---|---|
| THK-5472 | [structure] | 550.0 | >10,000 | >10,000 |
| THK-5473 | [structure] | 294.0 | >10,000 | >10,000 |
| THK-5474 | [structure] | 12.2 | >10,000 | 9,626 |
| THK-5351 | [structure] | 5.0 | >10,000 | 150 |

Conclusion

From the above-mentioned results, it can be found that every of the above-mentioned compounds of the present invention showed remarkably higher binding properties against MAO-B than MAO-A or tau, which means that it has high selective binding properties and high affinity.

Test Example 2

In Vivo Autoradiography Against Human Necropsy Brain

Each 12 cm slice frozen section of a normal necropsy brain (55 years old man) and an Alzheimer's disease necropsy brain (77 years old man; neurofibrillary tangles stage was Braak stage VI) was dried at room temperature, and phosphate buffered saline (PBS) was added thereto and the wetting treatment was consucted for 30 minutes. Pre-incubation was conducted for 30 minutes by using PBS containing 1% bovine serum albumin (BSA). A PBS (370 kBq/mL) containing 1% BSA of the $^{18}$F labeled compound were added dropwise to the section, and the reaction was conducted at room temperature for 30 minutes. In order to evaluate a specific binding to MAO-B, a similar reaction to the above reaction was conducted in the presence of MAO-B selective inhibitor (that is, Lazabemide) (10 μM). After that, the section was washed by soaking it in PBS containing 1% BSA for 5 minutes, and further in PBS for 5 minutes twice. After the section was dried at room temperature, an imaging plate (GE healthcare, BAS-MS 2025) was exposed to light, and an image (spartial resolution 25 μm×25 μm) was acquired by a FLA-9500 imaging analyzer plate (GE healthcare). The adjacent sections were subjected to an immunostaining using MAO-B (manufactured from Sigma, Aldrich, Co. LLC), AT8 tau (manufactured from Innogenetics, N.V.), or 6F/3D 6-amyloid (DAKO) antibody, and the resulting stainned distributions were compared with a distribution of a binding to tracer. Similar tests were conducted by using as comparative compound, (S)-[$^{18}$F] HK-5174 (WO 2017/103257 A1), and(S)-[$^{18}$F] THK-5351, each having the following structural formula respectively.

Each chemical structure of THK-5470 as described herein, THK-5351 and THK-5174 each having similar structure to THK-5470 as comparative compound, as well Lazabemide is described below. These THK-5351 and THK-5174 are described in WO 2017/103257 A1.

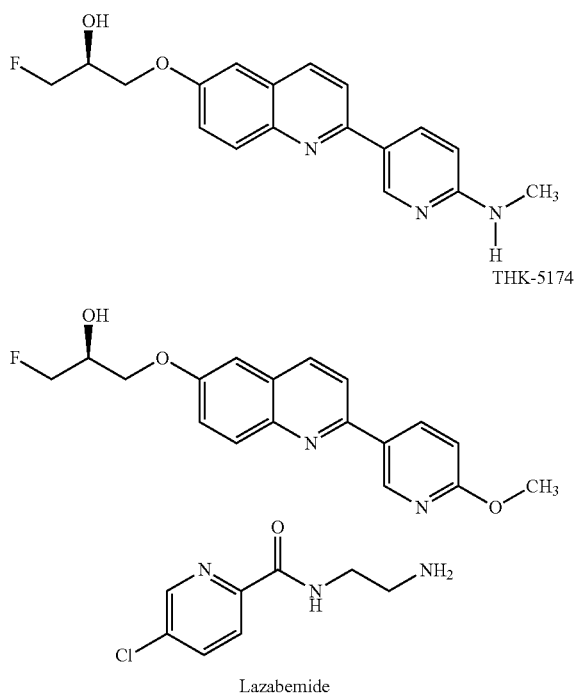

THK-5351

THK-5174

Lazabemide (Results)

The autoradiograpghy's results are shown in FIG. 1. It was confirmed that the(S)-[$^{18}$F] HK-5351 as comparative compound showed high accumulation in Alzheimer's disease (AD) frontal lobe sections, and the decrease in the binding in the presence of MAO-B selective inhibitor, that is, Lazabemide was observed, however, the remaining of laminar-like accumulation was observed, and its destribution was identical with that for immunostaining of tau (indicated by an arrow symbol). That is, it can be found that [$^{18}$F] THK-5351 binds to both MAO-B and tau. Whereas, the(S)-[$^{18}$F] THK-5174 as comparative compound has high non-specific binding to white matter myelin fiber (see FIG. 1, middle row), and no specific binding to MAO-B could not be recognized.

Whereas, (S)-[$^{18}$F] HK 5470 as the compound of the preset invention showed higher accumulation in a frontal lobe section of AD as compared to a frontal lobe section as control. Since the binding was completely replaced with Lazamide, the binding was judged to be a selective and specific binding to MAO-B.

From the above-mentioned results, it can be found that the compound of the present invention, that is, [$^{18}$F] THK-5470 showed selective and specific binding to MAO-B, which means that it has an excellent property as MAO-B PET probe.

Test Example 3

Dynamic Evaluation of the Compound of the Present Invention: [$^{18}$F] THK-5470 in Normal Mouse Each saline containing [$^{18}$F] HK-5470 as the compound of the present invention, (S)-[$^{18}$F] HK-5174 as the comparative compound, or [$^{18}$F] HK-5351 as the $^{18}$F labeled-compound (740 kBq) was administered intravenously via tail to male ICR mouse (6 weeks old), and after 2 min., 10 min., 30 min., 60 min., and 120 min., cervical dislocation of mouse was performed under ether anesthesia, and each organ tissue including brain was extracted, and a weight and a radioactivity of each organ was measured with Gamma counter (AccuFLEX γ7000, measured by Hitachi-Aloka Medical, Tokyo). The accumulation of radioactivity was evaluated by making the ratio of radioactivity per weight of tissue against total administered radioactivity (% Injected Dose/g of tissue; % ID/g) an index. The evaluation was conducted in a ratio of four per group.

(Results)

Figure 2:
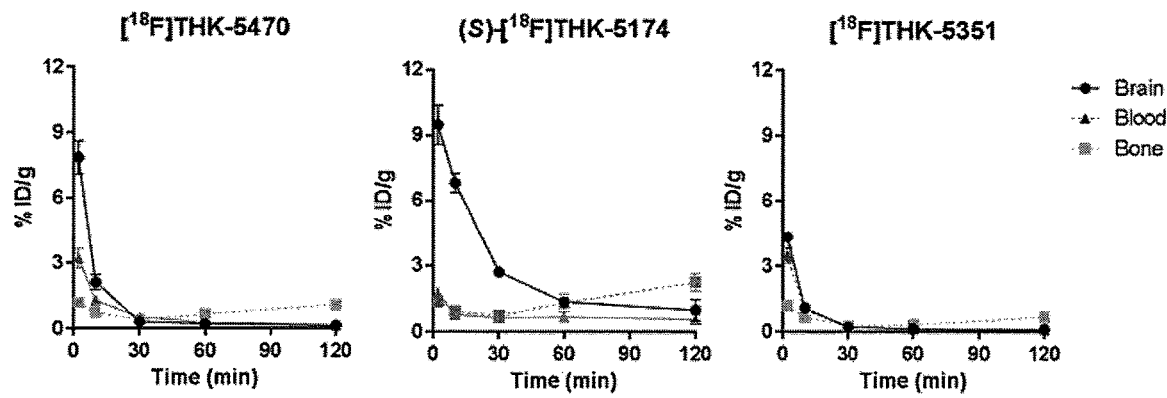
FIG. 2 is a diagram showing dynamic evaluation based on accumulation distribution in brain, blood or bone of normal mouse by using the compound of the present invention ((S)-[$^{18}$F] THK-5470) and control compound ((S)-[$^{18}$F] THK-5174, or(S)-[$^{18}$F] THK-5351).

Results of body distribution (brain, blood, and bone) in normal mouse are indicated in FIG. 2.

[$^{18}$F] THK-5470 as the compound of the present invention showed a high brain delivery of 7.9% ID/g after 2 minutes of administration, and the disappearance thereof was also rapid.

Whereas, (S)-[$^{18}$F] THK-5174 as the comparative compound showed a high incorporation into brain of 9.5% ID/g after 2 minutes of the admnistration, however, the disappearance thereof was gradual.

[$^{18}$F] THK-5470 as the compound of the present invention showed 25, 39, or 57 as the ratio of 2 min./30 min., the ratio of 2 min./60 min., or the ratio of 2 min./120 min., respectively, which was superior to [$^{18}$F] THK-5351 as the comparative compound.

Also, a defluorination to bone could not be confirmed similarly to [$^{18}$F] THK-5351 as the comparative compound.

From the above-mentioned results, [$^{18}$F] THK-5470 as the compound of the present invention showed excellent pharmacokinectics as MAO-B PET tracer.

INDUSTRIAL APPLICABILITY

The compound of the present invention has high specificity and selectivity for monoamine oxidase-B (MAO-B), which is remarkably useful for a diagnosis of a wide range of MAO-B related-neurological diseases, and a qualification of astrocyte. Accordingly, the compound of the present invention can be applied to a development and a study for MAO-B binding probe and MAO-B diagnostic imaging method, and so on.

The invention claimed is:

1. A compound selected from the group consisting of:

THK-5470

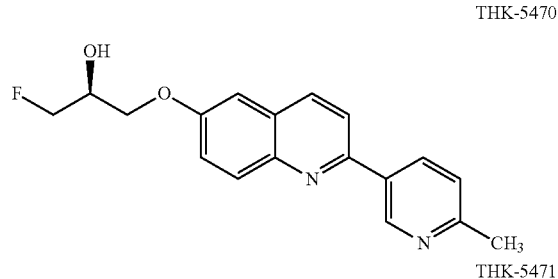

THK-5471

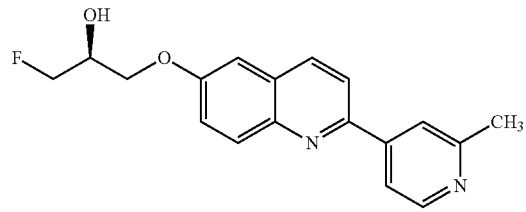 [SMILES: Cc1cc(-c2ccc3cc(OC[C@H](O)CF)ccc3n2)ccn1]

THK-5474

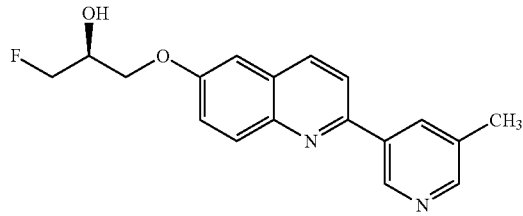 [SMILES: Cc1cncc(-c2ccc3cc(OC[C@H](O)CF)ccc3n2)c1]

and, or a pharmaceutically acceptable salt of the compound or a pharmaceutically acceptable solvate of the compound.

2. The compound according to claim 1, wherein the compound, the pharmaceutically acceptable salt of the compound or the pharmaceutically acceptable solvate of the compound is labeled with at least one radioactive nuclide or at least one positron emitting nuclide.

3. The compound according to claim 2, wherein the radioactive nuclide is at least one selected from the group consisting of $^3$H and $^{14}$C, and the positron emitting nuclide is at least one selected from the group consisting of $^{11}$C, $^{13}$N, $^{15}$O, and $^{18}$F.

4. The compound according to claim 2, wherein the compound is selected from the group consisting of:

[18F]THK-5470

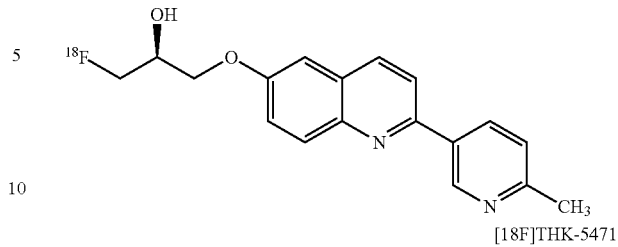

[18F]THK-5471

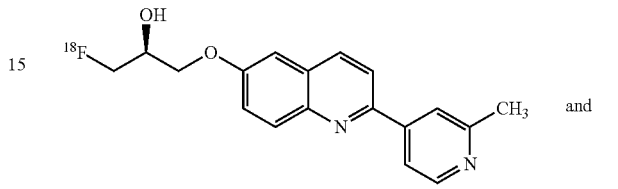

and

[18F]THK-5474

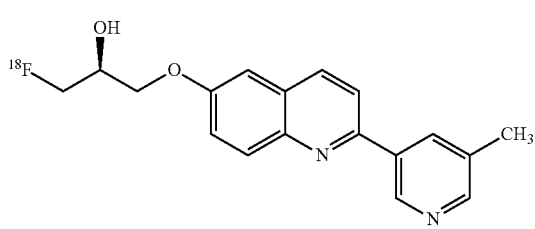

or a pharmaceutically acceptable salt of the compound or a pharmaceutically acceptable solvate of the compound.

* * * * *